US006829523B2

(12) United States Patent
Hanson

(10) Patent No.: US 6,829,523 B2
(45) Date of Patent: Dec. 7, 2004

(54) METHOD AND APPARATUS FOR CONTROLLING A TRANSPORT TEMPERATURE CONTROL UNIT HAVING SELECTIVELY PROGRAMMABLE TEMPERATURE RANGES

(75) Inventor: Jay L. Hanson, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 67 days.

(21) Appl. No.: 10/083,137

(22) Filed: Feb. 26, 2002

(65) Prior Publication Data

US 2003/0163225 A1 Aug. 28, 2003

(51) Int. Cl.$^7$ ............................................. G05D 23/00
(52) U.S. Cl. ..................... 700/299; 165/203; 165/200; 700/300; 62/159
(58) Field of Search ................................ 700/299, 300; 62/159, 175; 340/426.14, 449; 165/200–203, 42, 43

(56) References Cited

U.S. PATENT DOCUMENTS

| | | |
|---|---|---|
| 4,206,872 A | 6/1980 | Levine |
| 4,274,145 A | 6/1981 | Hendricks et al. |
| 4,298,946 A | 11/1981 | Hartsell et al. |
| 4,308,991 A | 1/1982 | Peinetti et al. |
| 4,341,345 A | 7/1982 | Hammer et al. |
| 4,359,084 A | 11/1982 | Geverath et al. |
| 4,386,649 A | 6/1983 | Hines et al. |
| 4,606,401 A | 8/1986 | Levine et al. |
| 4,621,336 A | 11/1986 | Brown |
| 4,771,392 A | 9/1988 | Hall |
| 4,819,441 A | 4/1989 | Hanson |
| 4,911,358 A | 3/1990 | Mehta |
| 4,967,382 A | 10/1990 | Hall |
| 4,970,496 A | * 11/1990 | Kirkpatrick .................. 340/585 |
| 5,088,645 A | 2/1992 | Bell |
| 5,104,037 A | * 4/1992 | Karg et al. ................. 236/46 R |
| 5,123,252 A | * 6/1992 | Hanson .......................... 62/89 |
| 5,197,297 A | 3/1993 | Brendel et al. |
| 5,209,397 A | * 5/1993 | Arold et al. ................ 236/49.3 |
| 5,222,368 A | * 6/1993 | Hanson ........................ 62/126 |
| 5,267,443 A | 12/1993 | Roehrich et al. |
| 5,267,446 A | 12/1993 | Viegas et al. |
| 5,275,012 A | 1/1994 | Dage et al. |
| 5,311,927 A | 5/1994 | Taylor et al. |
| 5,329,991 A | 7/1994 | Mehta et al. |
| 5,515,693 A | 5/1996 | Cahill-O'Brien et al. |
| 5,551,169 A | 9/1996 | Baker et al. |

(List continued on next page.)

Primary Examiner—Leo Picard
Assistant Examiner—Sean Shechtman
(74) Attorney, Agent, or Firm—Michael Best & Friedrich LLP

(57) ABSTRACT

A method of controlling a transport temperature control unit having cooling and heating cycles for cooling and heating a conditioned space within a transport. The method includes programming a first pre-programmed control mode into the unit, configuring the unit such that a second control mode is programmable into the unit by an end user, querying the end user to select the first pre-programmed control mode or to program the second control mode into the unit, and programming the second control mode into the unit by the end user when the second control mode is desired by the end user. A transport temperature control unit for performing the same and including a first pre-programmed control mode being programmable into the unit and a second control mode being programmable into the unit by an end user. The end user selectively determining whether the first pre-programmed control mode is selectable to control operation of the unit within the conditioned space or the second control mode is programmable into the unit to control operation of the unit within the conditioned space. The second control mode is programmable into the unit by the end user when the second control mode is desired by the end user.

33 Claims, 18 Drawing Sheets

U.S. PATENT DOCUMENTS

| | | | |
|---|---|---|---|
| 5,557,941 A | * | 9/1996 | Hanson et al. ................. 62/160 |
| 5,564,285 A | * | 10/1996 | Jurewicz et al. ............... 62/127 |
| 5,579,648 A | | 12/1996 | Hanson et al. |
| 5,671,609 A | | 9/1997 | Lionetti |
| 5,775,406 A | | 7/1998 | Ghitea, Jr. |
| 5,782,296 A | | 7/1998 | Mehta |
| 5,873,520 A | * | 2/1999 | Ratgeber et al. ............... 236/94 |
| 5,924,486 A | | 7/1999 | Ehlers et al. |
| RE36,437 E | * | 12/1999 | Hanson et al. ........... 123/179.4 |
| 6,607,029 B2 | * | 8/2003 | Danieau ..................... 165/203 |
| 2003/0024256 A1 | * | 2/2003 | Hanson ....................... 62/208 |

\* cited by examiner

METHOD AND APPARATUS FOR CONTROLLING A TRANSPORT TEMPERATURE CONTROL UNIT HAVING SELECTIVELY PROGRAMMABLE TEMPERATURE RANGES

FIELD OF THE INVENTION

The present invention relates to a method and apparatus for controlling a transport temperature control unit and, more particularly, to a method and apparatus for controlling a transport temperature control unit having temperature ranges selectively programmable by an end user.

BACKGROUND OF THE INVENTION

Straight trucks and tractor-trailers are often used as a means to transport cargo that must be maintained at a predetermined temperature during transportation in order to preserve the quality of the cargo. This cargo may be food, agricultural goods or various other temperature critical items. Hereinafter, any vehicle that transports cargo that must be maintained at a predetermined temperature during transportation will be referred to as a transport or transport vehicle. Hereinafter, the term cargo means any item that is transported, stored or otherwise supported within the conditioned space of a transport vehicle that must be maintained at a predetermined temperature.

Transport vehicles that transport such temperature sensitive cargo are constructed with a conditioned space that is maintained at a predetermined temperature by a temperature control unit. Some transport vehicles have a plurality of conditioned spaces, which may be maintained at the same predetermined temperature or varying predetermined temperatures by the unit. The temperature control unit typically includes pre-programmed temperature control ranges. The ranges typically have a minimum and a maximum temperature, and include pre-programmed operations for controlling the temperature control unit. A user enters a desired thermal setpoint for each conditioned space and the temperature control unit operates accordingly in each conditioned space with the pre-programmed operations of the ranges in which the thermal setpoints lie within.

SUMMARY OF THE INVENTION

One problem with the above-described temperature control unit is that the unit operates according to pre-programmed operations programmed into the unit, therefore, limiting or preventing user's preferences.

Another problem with the above-described temperature control unit is that the temperature control unit has similar operations for varying types of cargo.

A further problem with the above-described temperature control unit is that the temperature control unit operates with greater fuel consumption then is optimally achievable.

The present invention provides a method of controlling a temperature control unit that substantially alleviates one or more of the above-described and other problems. More particularly, in some constructions and in some aspects of the invention, the invention provides a method and apparatus for controlling a temperature control unit, which accommodates operations to be programmed into the temperature control unit by an end user after the pre-programmed operations have been programmed into the unit usually by the manufacturer. In some constructions and in some aspects of the invention, a method and apparatus is provided for controlling a temperature control unit to operate with optimum operations for the type of cargo within the conditioned space. In some constructions and in some aspects of the invention, the invention provides a temperature control unit in which fuel efficiency is increased by selectively programming operations into the temperature control unit by an end user.

More particularly, the invention provides a method of controlling a transport temperature control unit having cooling and heating cycles for cooling and heating a conditioned space within a transport. The method includes programming a first pre-programmed control mode into the unit, configuring the unit such that a second control mode is programmable into the unit by an end user, querying the end user to select the first pre-programmed control mode or to program the second control mode into the unit, and programming the specific operating parameters of the second control mode into the unit by the end user when the second control mode is desired by the end user.

More particularly, the invention provides a method wherein programming the second control mode into the unit by the end user when the second control mode is desired by the end user may include selecting a fuel saver timer operable to decrease fuel consumption of the unit. Additionally, when the second control mode is chosen, the end user may select a high speed cool to low speed cool switch point at which point the unit switches between high speed cool and low speed cool in the conditioned space. Programming the second control mode into the unit by the end user may include selecting a restart temperature at which temperature the conditioned space restarts from a null condition. Additionally, programming the second control mode into the unit by the end user may include selecting fan operation of the unit in the conditioned space. Additionally, programming the second control mode into the unit by the end user may include selecting a low speed heat to low speed cool switch point at which point the unit switches between low speed heat and low speed cool in the conditioned space. Additionally, programming the second control mode into the unit by the end user may include selecting door switch options by the end user.

The temperature control unit may include a programmable temperature range. The programmable temperature range may be operable to control the operation of the unit in the conditioned space by being selectively operable to utilize one of the first pre-programmed control mode and the second control mode. The method may include querying the end user to select numerical temperature values for the programmable temperature range. The temperature values may include a minimum temperature value and a maximum temperature value. The method may include selecting a priority for the programmable temperature range by the end user. The method may include selecting a unit control mode for the programmable temperature range. Selecting the unit control mode for the programmable temperature range may include selecting one of a cycle mode, a continuous mode and a cycle/continuous select mode (cycle, continuous and cycle/continuous select modes discussed in greater detail below). The unit control mode may be one of a cycle mode, a continuous mode and a cycle/continuous select mode.

The conditioned space may be a first conditioned space and the programmable temperature may be a first programmable temperature range. The transport may include a second conditioned space and the unit may include a second programmable temperature range. The second programmable temperature range may be operable to control the operation of the unit in the second conditioned space by being selectively operable to utilize one of the first pre-programmed control mode or the second control mode. The first programmable temperature range and the second programmable temperature range may both be operable to utilize the first pre-programmed control mode or the second control mode. The method may include the step of selecting a first unit control mode for the first programmable temperature range and a second unit control mode for the second programmable temperature range. Each of the first and second unit control modes may be one of a cycle mode, a continuous mode or a cycle/continuous select mode. The method may include the step of selecting a first priority for the first programmable temperature range and a second priority for the second programmable temperature range by the end user. The first priority and the second priority may be different priorities. The method may include the step of determining which of the first priority and the second priority is a higher priority. The method may include the step of operating the temperature control unit in the unit control mode corresponding to the temperature range with the highest priority.

It is another feature of the present invention to provide a method of controlling a transport temperature control unit having cooling and heating cycles for cooling and heating a conditioned space within a transport. The temperature control unit includes a programmable temperature range. The method includes programming a first pre-programmed control mode into the unit, configuring the unit such that a second control mode is programmable into the unit by an end user, querying the end user to select numerical temperature values for the programmable temperature range, querying the end user to select the first pre-programmed control mode for operation of the programmable temperature range or to program the second control mode into the unit for operation of the programmable temperature range, and programming the second control mode into the unit by the end user when the second control mode is desired by the end user.

A further feature of the present invention is to provide a transport temperature control unit having cooling and heating cycles for cooling and heating a conditioned space within a transport that includes a first pre-programmed control mode being programmable into the unit and a second control mode being programmable into the unit by an end user. The end user selectively determines whether the first pre-programmed control mode is selectable to control operation of the unit within the conditioned space or the second control mode is programmable into the unit to control operation of the unit within the conditioned space. The second control mode is programmable into the unit by the end user when the second control mode is desired by the end user.

Figure 1A:
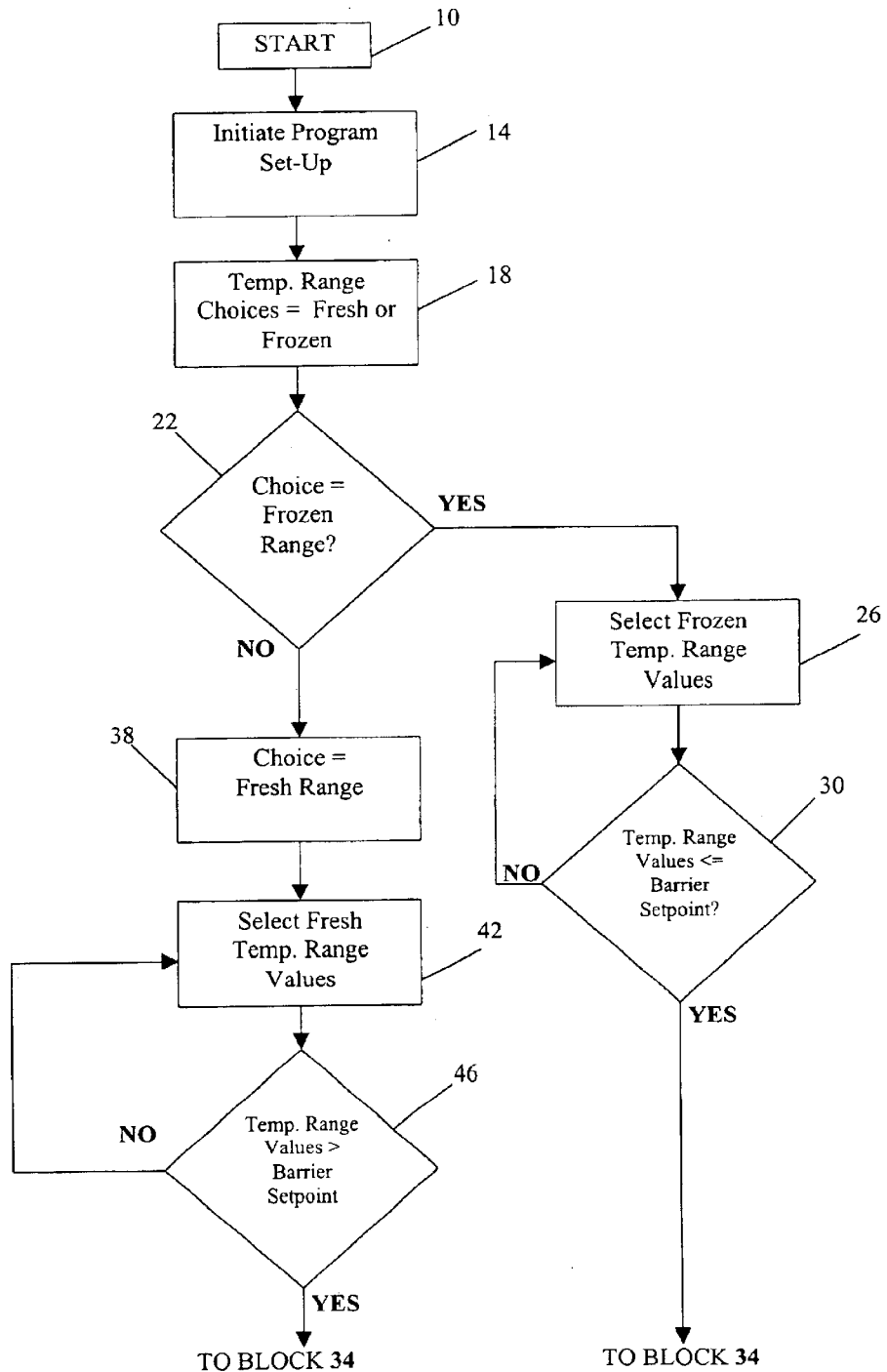
FIGS. 1a–1g are flow charts showing a main routine of a method of controlling a transport temperature control unit having cooling and heating cycles for cooling and heating a conditioned space.

Before one embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting. The use of "including", "comprising" and "having" and variations thereof herein is meant to encompass the items listed thereafter and equivalents thereof as well as additional items.

DETAILED DESCRIPTION OF THE PREFERRED EMBODIMENT

The method and apparatus of the present invention is used to configure the operation of a temperature control unit used to maintain a predetermined temperature within a conditioned space of a transport vehicle. The predetermined temperature is typically a thermal setpoint. More specifically, the temperature control unit includes programmable temperature ranges that can be programmed by an end user, wherein the term end user may be, but is not limited to, a customer that purchases the unit from a manufacturer, a customer that purchases the unit from another customer, a manufacturer that purchases the unit from another manufacturer, and a manufacturer that purchases the unit from a customer. The programmable temperature ranges have a minimum and a maximum temperature, along with programmable or selectable operations programmed or selected by the end user. The programmable temperature ranges are operable to control the temperature control unit within the conditioned space according to the operations selected by the end user. The operations of the programmable temperature ranges are selectable by the end user to enable the end user to customize performance of the temperature control unit based on the end user's needs and preferences. The operations of the programmable temperature ranges are also selectable to be more efficient and decrease the fuel consumption of the unit. In prior art temperature control units, the temperature ranges are pre-programmed by the manufacturer of the temperature control unit to accommodate general applications. The operations of the temperature ranges of the prior art temperature control units are fixed and unable to be altered, therefore, the operation of the prior art units remain the same for varying types of cargo that require various operating conditions. Temperature control charts representing temperature control when the programmable temperature ranges have various selected operations are described below with respect to FIGS. 4–9. An example of a temperature control unit embodying a preferred embodiment of the present invention is described below with respect to FIGS. 10 and 11.

The operations of the programmable temperature ranges are programmed or selected by the end user to include a unit control mode that operates the temperature control unit within the conditioned space. The unit control mode may be one of a cycle mode, a continuous mode or cycle/continuous select mode. The cycle mode cycles the unit between on and off or null based on the temperature within each conditioned space. If the temperature within the conditioned space is acceptable, the unit will go to null (off) within the conditioned space until the temperature is no longer acceptable. When the temperature is no longer acceptable, the unit will turn on or restart within the conditioned space to bring the temperature back to an acceptable temperature. Some transport vehicles may include more than one conditioned space. If this is the case, the unit will not go to null until the temperatures within all the conditioned spaces are acceptable. If one conditioned space has an acceptable temperature and another conditioned space has an unacceptable temperature, the unit will continue to run and the conditioned space with the unacceptable temperature will continue to be cooled or heated until the temperature within the conditioned space is acceptable, however, the conditioned space with the acceptable temperature will not be cooled or heated while the unit continues to run. When one conditioned space has an acceptable temperature and another conditioned space has an unacceptable temperature, the conditioned space with the acceptable temperature is running null (the conditioned space with the acceptable temperature is null and the conditioned space with the unacceptable temperature is being heated or cooled). Running null occurs in cycle mode when the transport vehicle has more than one conditioned space and one of the conditioned spaces require heating or cooling.

The continuous mode runs the unit continuously. The unit will not shut off when the conditioned space has an acceptable temperature. If the transport vehicle only has a single conditioned space and the temperature is satisfied within that conditioned space, the unit will cycle between heating and cooling the conditioned space when the unit is in the continuous mode. The transport vehicle may also include a plurality of conditioned spaces. If the transport vehicle includes a plurality of conditioned spaces and the unit is in continuous mode, the unit will cycle between heating and cooling the conditioned space that achieves a satisfactory temperature last. In other words, if all the conditioned spaces reach a satisfactory temperature, the last conditioned space to reach the satisfactory temperature will continue to be heated or cooled by the unit while the other conditioned spaces will not be heated or cooled.

The select mode is different from the cycle mode and the continuous mode, in that, the cycle/continuous select mode transfers the option of selecting either cycle mode or continuous mode from the end user to a secondary user. The secondary user may be, but is not necessarily limited to, a transport vehicle operator, loading dock personnel, and a product handler (people who load and unload cargo into the transport vehicle). The cycle mode and the continuous mode are programmed or selected by the end user when he/she is programming or selecting the operations of the programmable temperature range. For cycle/continuous select mode, the end user programs or selects cycle/continuous select mode while programming or selecting the operations of the programmable temperature range. The secondary user then selects between cycle mode and continuous mode at a later time, after all the operations for the programmable temperature range have been selected, typically when the conditioned space is being prepared to transport cargo.

The flow charts represented in the figures outline an algorithm in the form of a computer program that can be used to practice the method of the preferred embodiment. The program includes two separate software routines. For purposes of description only, the two separate software routines will be referred to below as the main routine and the door interrupt routine. The main routine illustrates the selectable operations for the each programmable temperature range. The door interrupt routine may be called into the main routine at any point throughout the main routine upon a door on the transport vehicle being opened to the conditioned space (door interrupt routine discussed in greater detail below). An operation routine has also been included to illustrate operation of the unit after the operations of the temperature ranges have been selected. In the operation routine, for example, the transport vehicle has first, second and third conditioned spaces. The operation routine is typically performed with a combination of commands executed by the program and inputs or selections made by the secondary user for the program. The method can be practiced using any device capable of storing and processing the data in the manner described below with reference to the operation routine.

FIGS. 1a–1g illustrate the main routine of the program. In the main routine, the operations of a programmable temperature range are selected according to the user's needs and preferences. The preferred embodiment of the present invention allows the unit to have a maximum of ten temperature ranges and a minimum of two temperature ranges. However, the unit may have any number of temperature ranges and still be within the scope of the present invention. The program illustrated in the figures and described herein illustrates and describes the selectable operations for any number of temperature ranges and, therefore, the program can be used to select the operations of any number of temperature ranges desired by the end user.

As seen in FIG. 1a, the main routine of the program starts at block 10. At block 14, the program initiates program set-up. The initiation of the program set-up may include, but is not limited to turning the unit on, powering-up the unit, checking for errors in the unit and any other initializing sequences that may occur during start-up of the program and/or the unit. After the program initiates, the program proceeds to block 18 where a frozen temperature range or a fresh temperature range can be selected by an end user. In the preferred embodiment of the present invention, the temperature ranges of the temperature control unit may have a minimum temperature of −25° F. and a maximum temperature of 90° F., however, the temperature ranges of the unit may have any minimum and maximum temperature and still be within the scope of the present invention. The frozen temperature range can vary between the minimum temperature of the temperature control unit (−25° F.) and a predetermined barrier setpoint. The barrier setpoint is a temperature that is a barrier between the frozen temperature range and the fresh temperature range. In the preferred embodiment, the barrier setpoint is 15° F., however, any barrier setpoint may be used and still be within the scope of the present invention. Any temperature ranges with temperatures set below the barrier setpoint are frozen ranges and any temperature ranges with temperatures above the barrier setpoint are fresh ranges. Temperature ranges are not allowed to include temperatures on both sides of the barrier setpoint.

Next, at block 22, the program determines if the end user selects the temperature range to be a frozen temperature range. If the temperature range is a frozen temperature range (YES at block 22), the program proceeds to block 26 where minimum and maximum temperatures or numerical temperature values are selected for the frozen temperature range. After the values are selected for the frozen temperature range, the program proceeds to block 30 where the program determines whether the values of the frozen temperature range are less than or equal to the barrier setpoint. As noted above, temperature ranges are not allowed to have temperatures or values on both sides of the barrier setpoint. If the values of the frozen temperature range are not less than or equal to the barrier setpoint (NO at block 30), the program returns to block 26 and new values for the frozen temperature range are selected. If the values of the frozen temperature range are less than or equal to the barrier setpoint (YES at block 30), the program proceeds to block 34 (FIG. 1b) where the priority of the frozen temperature range is selected by the end user.

Block 34 and the remainder of the program is similar for both frozen and fresh temperature ranges, therefore, the fresh temperature range will be described before the program proceeds to block 34. Referring back to block 22, if the program determines that the end user did not select the temperature range to be frozen (NO at block 22), the program proceeds to block 38 and the temperature range is a fresh temperature range. In the preferred embodiment, the program determines if the end user selects the temperature range to be a frozen temperature range at block 22, however, the program may determine if the end user selects the temperature range to be a fresh temperature range at block 22 and still be within the scope of the present invention. After the temperature range is selected to be a fresh temperature range at block 38, the program proceeds to block 42 where minimum and maximum temperatures or numerical temperature values are selected for the fresh temperature range. After the values are selected for the fresh temperature range, the program proceeds to block 46 where the program determines if the values of the fresh temperature range are greater than the barrier setpoint. If the values of the fresh temperature range are not greater than the barrier setpoint (NO at block 46), the program returns to block 42 and new values for the fresh temperature range are selected. If the values of the fresh temperature range are greater than the barrier setpoint (YES at block 46), the program proceeds to block 34 where the priority of the fresh temperature range is set.

Figure 1B:
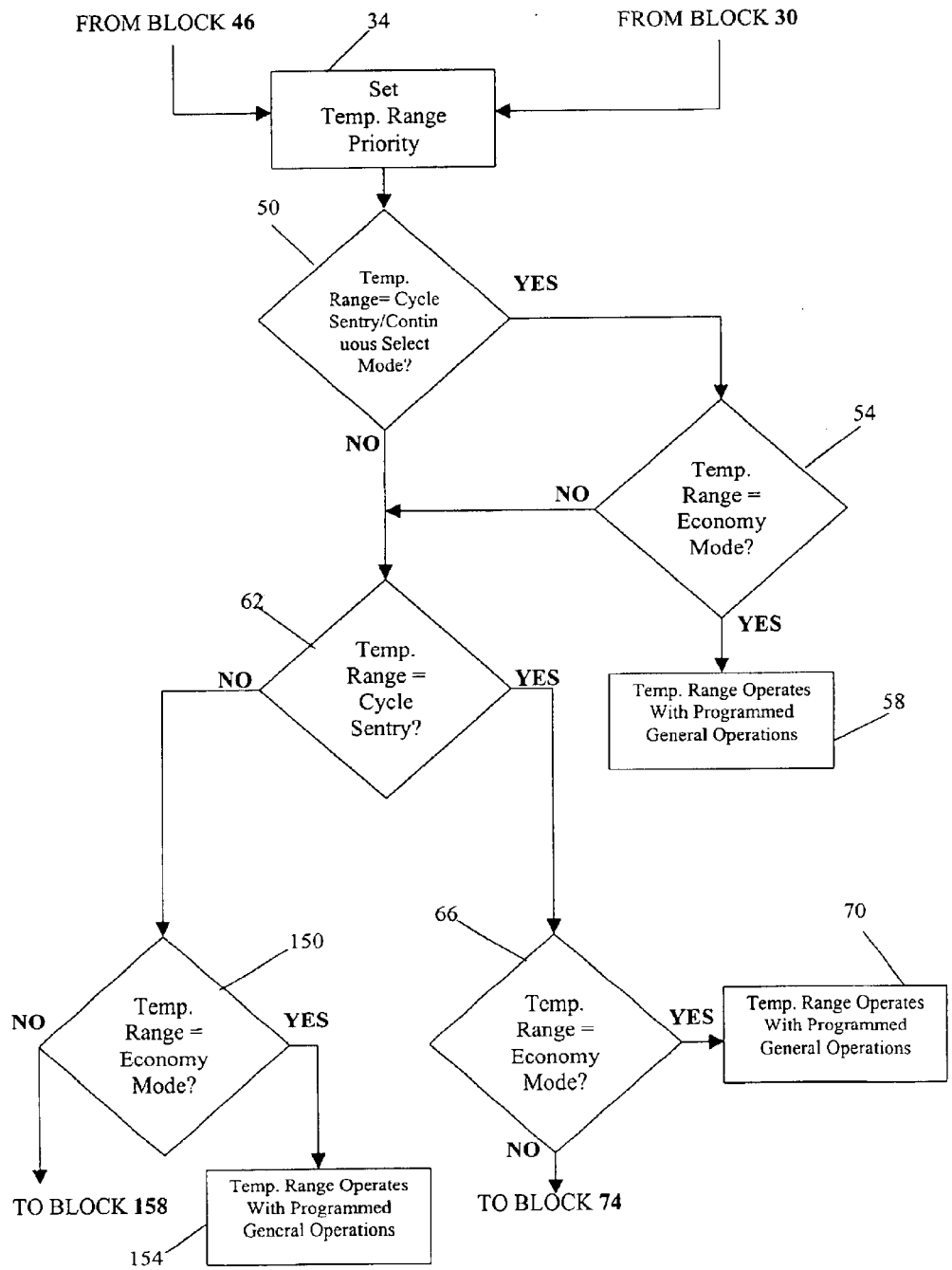

Referring to FIG. 1b, at block 34 the end user selects the priority of the temperature range (the remainder of the program is similar for both fresh and frozen temperature ranges, therefore, the term temperature range will be used rather than fresh temperature range and/or frozen temperature range). The priority of the temperature range prioritizes all of temperature ranges from most important, given the priority value of 1, to the least important, given the priority value equal to the number of temperature ranges programmed into the temperature control unit by the end user (largest priority value possible is 10 in the preferred embodiment). The end user may select one unit control mode (cycle mode, continuous mode, or cycle/continuous select mode) for each temperature range to control operation of the temperature control unit within each conditioned space (conditioned space indicated as CS in flow charts). The temperature control unit can only operate in a single mode, continuous or cycle, therefore, the temperature range with the highest priority (lowest priority value) will determine whether the temperature control unit operates in cycle mode or continuous mode. The sensitivity of the cargo to changes in temperature and the importance of the cargo being transported within the conditioned space typically determine priority of the programmable temperature ranges.

The program then continues to block 50 where the program determines if the end user selects the temperature range to be cycle/continuous select mode. The cycle/continuous select mode gives the secondary user a choice to select between cycle mode or continuous mode to control the operation of the temperature control unit within the conditioned space after the operations of the temperature range have been selected by an end user, rather than the end user selecting cycle mode or continuous mode for the temperature range when selecting operations for the temperature range. If the end user selects cycle mode or the continuous mode for the temperature range, the secondary user may not select between cycle mode and continuous mode. If the unit control mode of the temperature range is cycle/continuous select mode (YES at block 50), the program proceeds to block 54.

At block 54, the program determines if the end user selects a first pre-programmed control mode (an economy mode) for the temperature range. The economy mode is a pre-programmed mode programmed into the temperature control unit by the manufacturer of the temperature control unit to include pre-programmed general operations to control the temperature control unit within the conditioned space. The general operations may be used for all applications where customizing performance of the temperature control unit through the temperature ranges is not desired. If the program determines that the end user selects the economy mode for the temperature range (YES at block 54), the program proceeds to block 58 where the temperature range operates with the pre-programmed general operations and controls the unit within the conditioned space according to temperature control charts illustrated in FIGS. 4 and 5 (discussed in greater detail below). The temperature range will operate according to FIG. 4 if the temperature range is selected to be a frozen range and according to FIG. 5 if the temperature range is selected to be a fresh range. If the end user did not select the economy mode for the temperature range, than the program will proceed and a second control mode will be programmed.

Referring back to block 54, if the program determines that the end user did not select economy mode for the temperature range (NO at block 54), the program proceeds to block 62 where the program determines if the end user has selected cycle mode for the temperature range. Referring back to block 50, if the program determines that the end user did not select cycle/continuous select mode for the temperature range (NO at block 50), the program proceeds to block 62 (similarly to NO at block 54). If the program determines that the end user selects cycle mode for the temperature range (YES at block 62), the program proceeds to block 66 where the program determines if the end user has selected economy mode for the temperature range. If the program determines that the end user selects economy mode for the temperature range (YES at block 66), the program proceeds to block 70 where the temperature range operates with the preprogrammed general operations as discussed above. If the program determines that the end user did not select the economy mode for the temperature range (NO at block 66), the program proceeds to block 74.

Figure 1C:
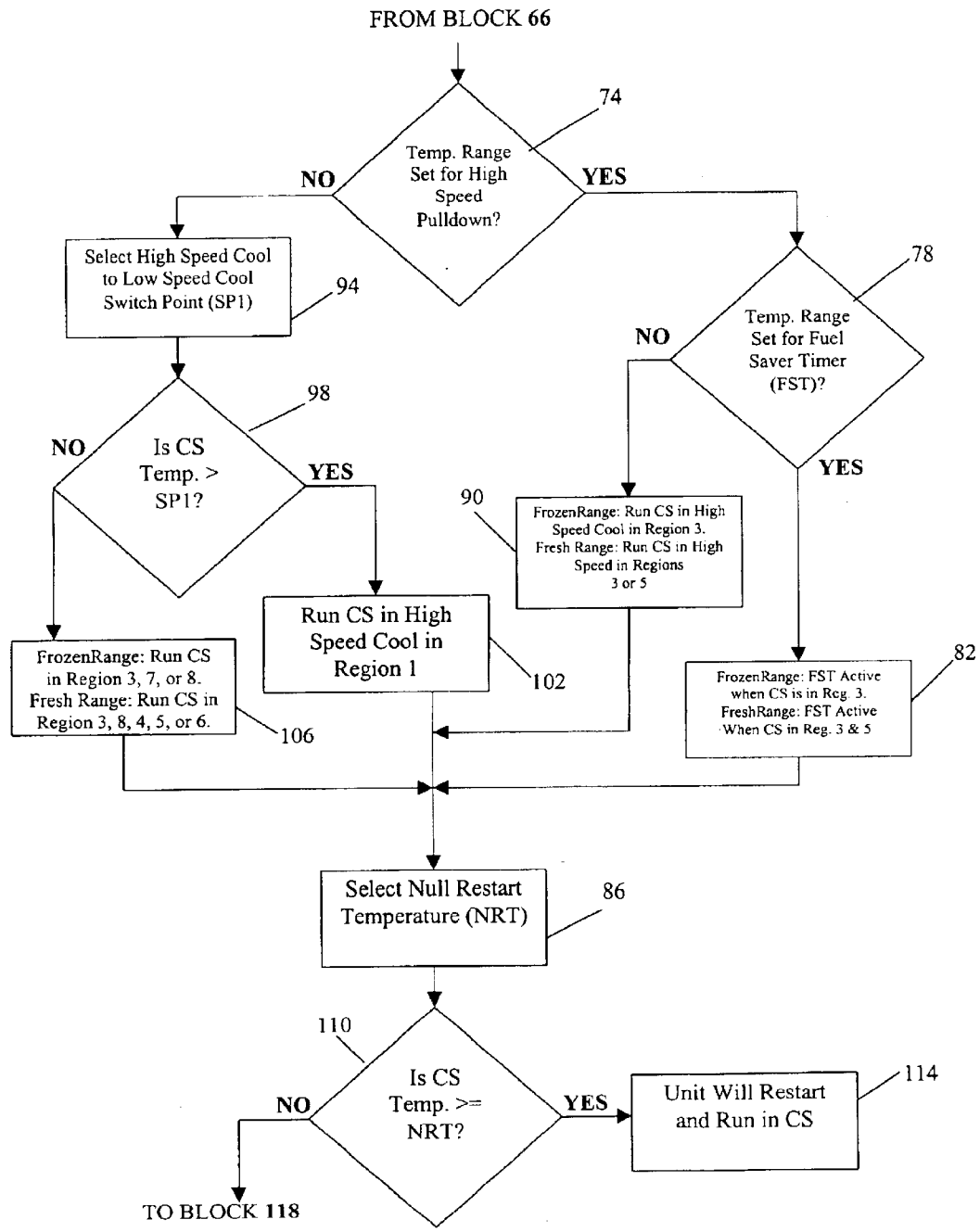

Referring to FIG. 1c, at block 74, the program determines if the end user selects high speed pulldown for the temperature range. High speed pulldown is a selectable operation for the temperature control unit that facilitates the temperature control unit to run in high speed until the temperature in the conditioned space reaches the thermal setpoint. High speed pulldown may bring the temperature in the conditioned space to thermal setpoint quicker than if high speed pulldown was not selected for operation.

If the program determines that the end user selects high speed pulldown for the temperature range (YES at block 74), the program proceeds to block 78 where the program determines if the end user selects fuel saver timer (FST) for the temperature range. The FST helps obtain greater fuel savings for the unit by utilizing a variable delay based on an eight minute timer. The variable delay delays the unit from resuming high speed operation in the conditioned space after the unit is in a null or off condition in that particular conditioned space. Instead of resuming high speed operation during the delay, the unit runs in low speed in the conditioned space. When the temperature in the conditioned space rises a predetermined amount above or below the thermal setpoint in cycle mode or the temperature indicates a need for high speed in continuous mode (continuous mode will be discussed in greater detail below), the unit will first run in low speed. The eight minute timer starts when the unit first runs in low speed and the temperature is monitored in the conditioned space. The temperature must fall or rise (depending on if the unit is cooling or heating the conditioned space) a predetermined amount before the eight minute timer times out or the unit will run in high speed if allowed. If the temperature in the conditioned space does fall or rise the predetermined amount before the timer times out, the eight minute timer resets and the unit continues to run in low speed. Running the unit in high speed consumes more fuel than if the unit is running in low speed, therefore, delaying the unit from going directly to high speed saves fuel and decreases fuel consumption of the unit. If the program determines that the end user selects FST for the temperature range (YES at block 78), the program proceeds to block 82. If the temperature range is a frozen temperature range, the FST is active when the temperature in the conditioned space is in region 3 of the temperature control chart illustrated in FIG. 6 (discussed in greater detail below). If the temperature range is a fresh temperature range, the FST is active when the temperature in the conditioned space is in regions 3 and 5 of the temperature control chart illustrated in FIG. 7 (discussed in greater detail below).

After block 82 the program proceeds to block 86 where a null restart temperature (NRT) is selected. The NRT is a temperature in which the temperature control unit will restart cooling or heating after being in a non-cooling or non-heating condition within the conditioned space. The unit is typically in the non-cooling or non-heating condition because the temperature in the conditioned space is within an acceptable range of the thermal setpoint. When the temperature in the conditioned space exceeds or goes below the NRT, the temperature control unit will restart and heat or cool the conditioned space.

Returning back to block 78, if the program determines that the end user did not select FST for the temperature range (NO at block 78), the program proceeds to block 90. If the temperature range is a frozen temperature range, the unit will run in high speed cool in the conditioned space when the temperature in the conditioned space is in region 3 of the temperature control chart illustrated in FIG. 6 (discussed in greater detail below). If the temperature range is a fresh temperature range, the unit will run in high speed when the temperature in the conditioned space is in regions 3 and 5 of the temperature control chart illustrated in FIG. 7 (discussed in greater detail below). Without the FST, the unit runs immediately in high speed and does not initiate the eight minute timer or run in low speed. Next, the program proceeds to block 86 where the NRT is selected.

Referring back to block 74, if the program determines that the end user did not select high speed pulldown for the temperature range (NO at block 74), the program proceeds to block 94 where a high speed cool to low speed cool switch point (SP1) is selected by the end user. SP1 is a temperature at which the temperature control unit switches from high speed cool to low speed cool in the conditioned space. SP1 is only available if the end user does not select high speed pulldown for the temperature range. SP1 is a temperature set a predetermined amount above and/or below the thermal setpoint. The temperature control unit operates in high speed cool when the temperature in the conditioned space is above SP1 and the temperature control unit operates in high speed heat when the temperature in the conditioned space is below SP1. When the temperature in the conditioned space reaches SP1, the unit begins to run in low speed.

For example purposes only, the program will illustrate SP1 when it is a predetermined temperature above the thermal setpoint, however, the program may also illustrate SP1 when it is a predetermined temperature below the thermal setpoint. After SP1 is selected, the program proceeds to block 98 where the program determines if the temperature in the conditioned space is greater than SP1. If the temperature in the conditioned space is greater than SP1 (YES at block 98), the program will proceed to block 102 where the unit will run in high speed cool when the temperature in the conditioned space is in region 1 of temperature control charts illustrated in FIGS. 6 and 7 (discussed in greater detail below) for both fresh and frozen temperature ranges, respectively. Next, the program proceeds to block 86 where the NRT is selected.

Referring back to block 98, if the program determines that the temperature in the conditioned space is not greater than SP1 (NO at block 98), the program proceeds to block 106. If the temperature range is a frozen temperature range, the unit will be controlled in regions 3, 7, or 8 of the temperature control chart illustrated in FIG. 6 (discussed in greater detail below) depending on which region the temperature in the conditioned space is in. If the temperature range is a fresh temperature range, the unit will be controlled in regions 3, 8, 4, 5, or 6 of the temperature control chart illustrated in FIG. 7 (discussed in greater detail below) depending on which region the temperature in the conditioned space is in. After blocks 82, 90, 102 and 106, the program proceeds to block 86 where the NRT is selected.

After block 86, the program proceeds to block 110 where the program determines if the temperature in the conditioned space is greater than or equal to the NRT. If the temperature in the conditioned space is greater than or equal to the NRT (YES at block 110), the program proceeds to block 114 where the unit will restart after being in a null condition in the conditioned space.

Referring back to block 110, if the temperature in the conditioned space is not greater than or equal to the NRT (NO at block 110), the program proceeds to block 118 where the program determines if the temperature in the conditioned space is in region 3 of the temperature control charts illustrated in FIG. 6 and/or FIG. 7 (discussed in greater detail below).

Figure 1D:
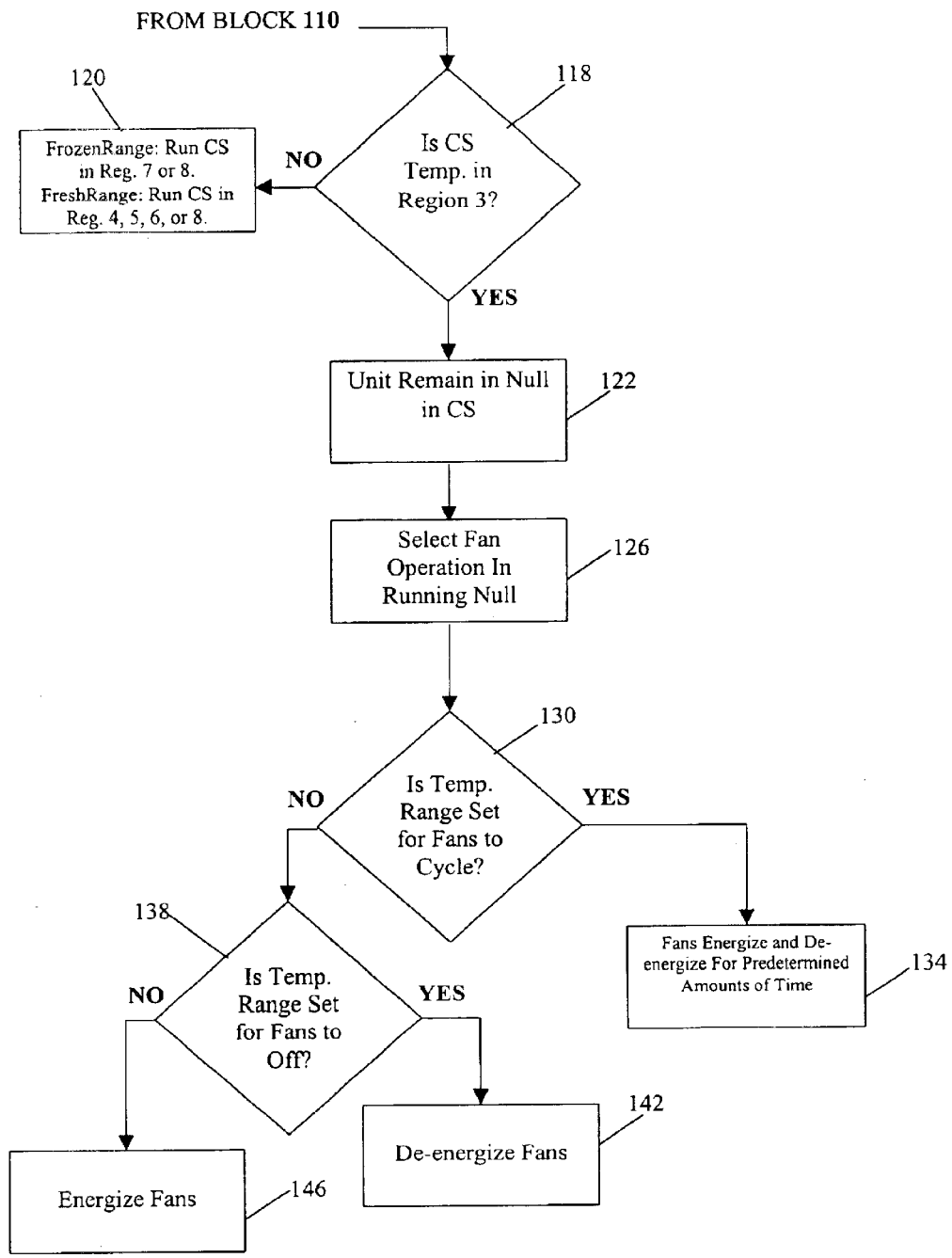
Figure 6:
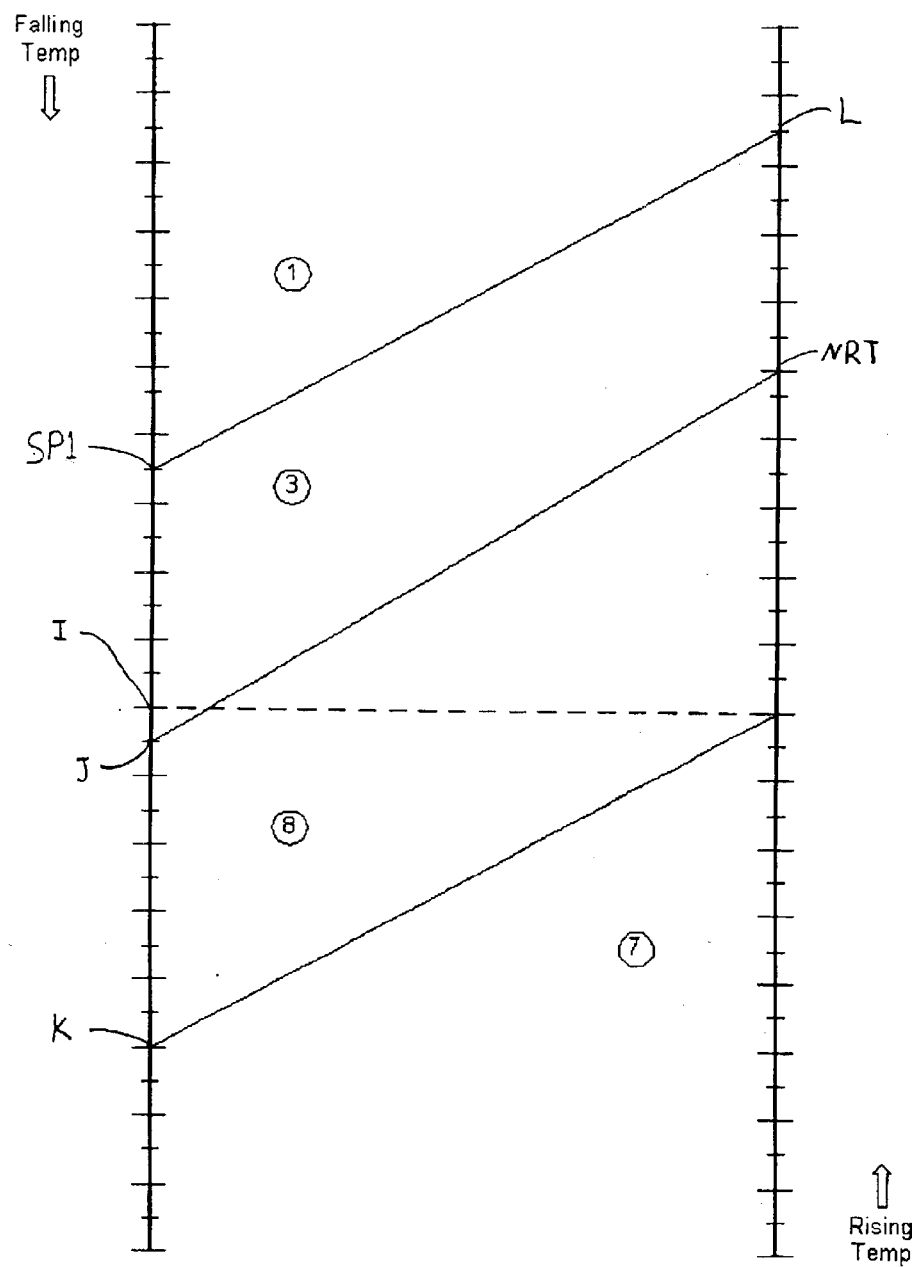
FIG. 6 is a temperature control chart representing temperature control when the programmable temperature range is a frozen range and cycle mode is selected by an end user as the unit control mode for the programmable temperature range.
Figure 7:
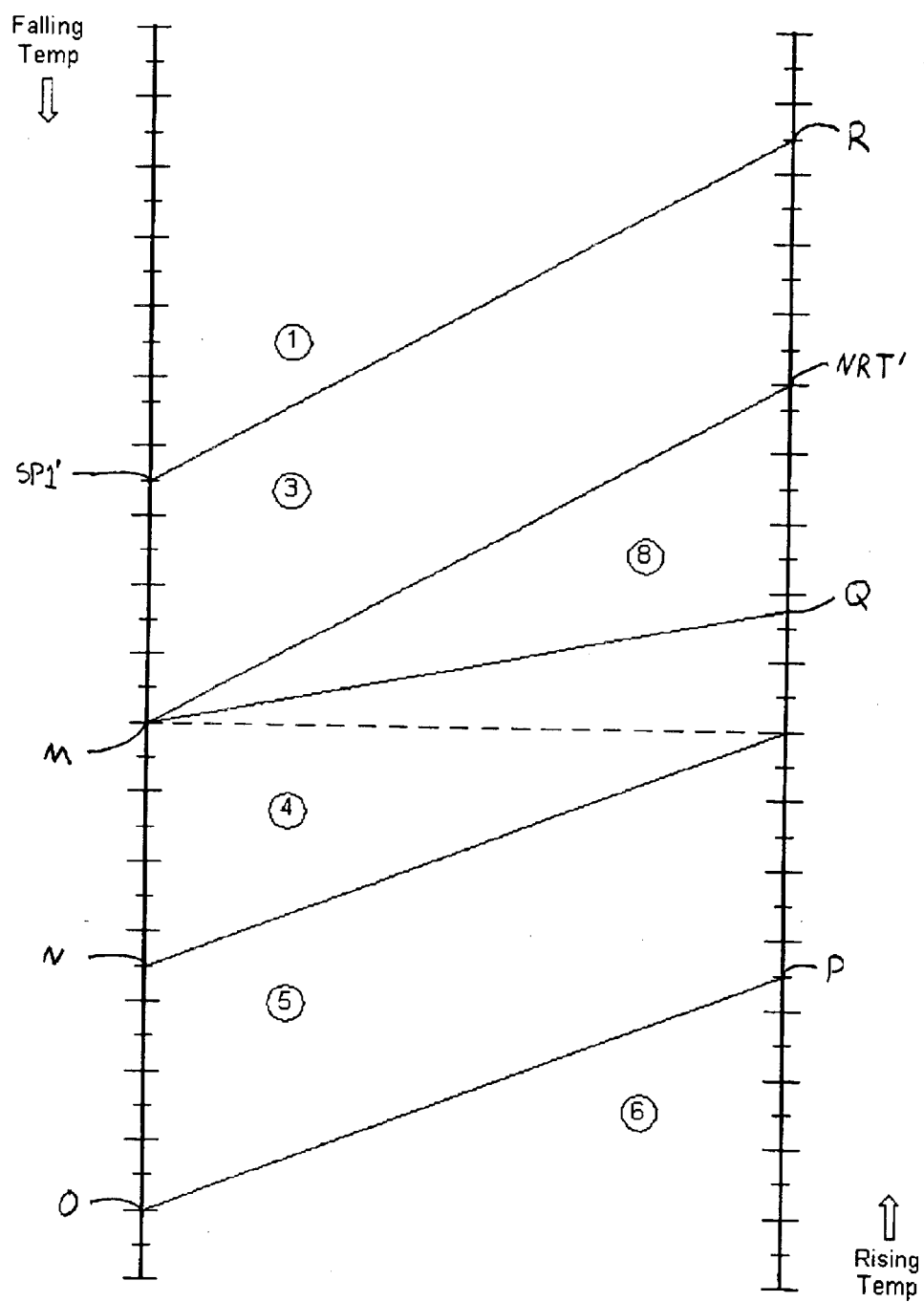
FIG. 7 is a temperature control chart representing temperature control when the programmable temperature range is a fresh range and cycle mode is selected by an end user as the unit control mode for the programmable temperature range.

Referring to FIG. 1d, if the program determines that the temperature in the conditioned space is in region 3 of temperature control charts illustrated in FIG. 6 and/or FIG. 7 (YES at block 118), the program proceeds to block 122 where the unit will remain in the null condition in the conditioned space.

Next, the program proceeds to block 126 where fan operations for the temperature range are selected while the conditioned space is running null. Running null is a condition in which the temperature control unit is running or on, but the conditioned space is not being heated or cooled. In the present invention, the fans can cycle or energize and de-energize for predetermined amounts of time, the fans can be on or energized, or the fans can be off or de-energized. After block 126, the program proceeds to block 130.

Before the program proceeds to block 130, refer back to block 118. If the program determines that the temperature in the conditioned space is not in region 3 of temperature control charts illustrated in FIG. 6 and/or FIG. 7 (NO at block 118), the program proceeds to block 120. If the temperature range is a frozen temperature range, the unit will be controlled in regions 7 or 8 of the temperature control chart illustrated in FIG. 6 (discussed in greater detail below) depending on which region the temperature in the conditioned space is in. If the temperature range is a fresh temperature range, the unit will be controlled in regions 4, 5, 6, or 8 of the temperature control chart illustrated in FIG. 7 (discussed in greater detail below) depending which region the temperature in the conditioned space is in.

After block 126, the program proceeds to block 130 where the program determines if the end user selects fans to cycle for the temperature range. If the program determines that the end user selects fans to cycle for the temperature range (YES at block 130), the program proceeds to block 134 where the fans energize and de-energize for predetermined amounts of time. In the present invention, the fans repeat between energizing for three minutes and de-energizing for three minutes until the fans are no longer required to energize and de-energize. However, the fans may energize and de-energize for any amount of time and still be within the scope of the present invention.

Referring back to block 130, if the program determines that the end user did not select fans to cycle for the temperature range (NO at block 130), the program proceeds to block 138 where the program determines if the end user selects fans to off for the temperature range. If the program determines that the end user selects fans to off for the temperature range (YES at block 138), the program proceeds to block 142 where the fans are de-energized in the conditioned space. Referring back to block 138, if the program determines that the end user did not select fans to off for the temperature range (NO at block 138), the program proceeds to block 146 where the fans are energized in the conditioned space.

Referring back to FIG. 1b and block 62, if the program determines that the end user did not select cycle mode for the temperature range (NO at block 62), the program proceeds to block 150 and the temperature range is in continuous mode. At block 150, the program determines if the end user selects economy mode for the temperature range. If the program determines that the end user selects economy mode for the temperature range (YES at block 150), the program proceeds to block 154 where the temperature range operates with the pre-programmed general operations.

Referring back to block 150, if the program determines that the end user did not select economy mode for the temperature range (NO at block 150), the program proceeds to block 158 where the program determines if the end user selects high speed pulldown for the temperature range.

Figure 1E:
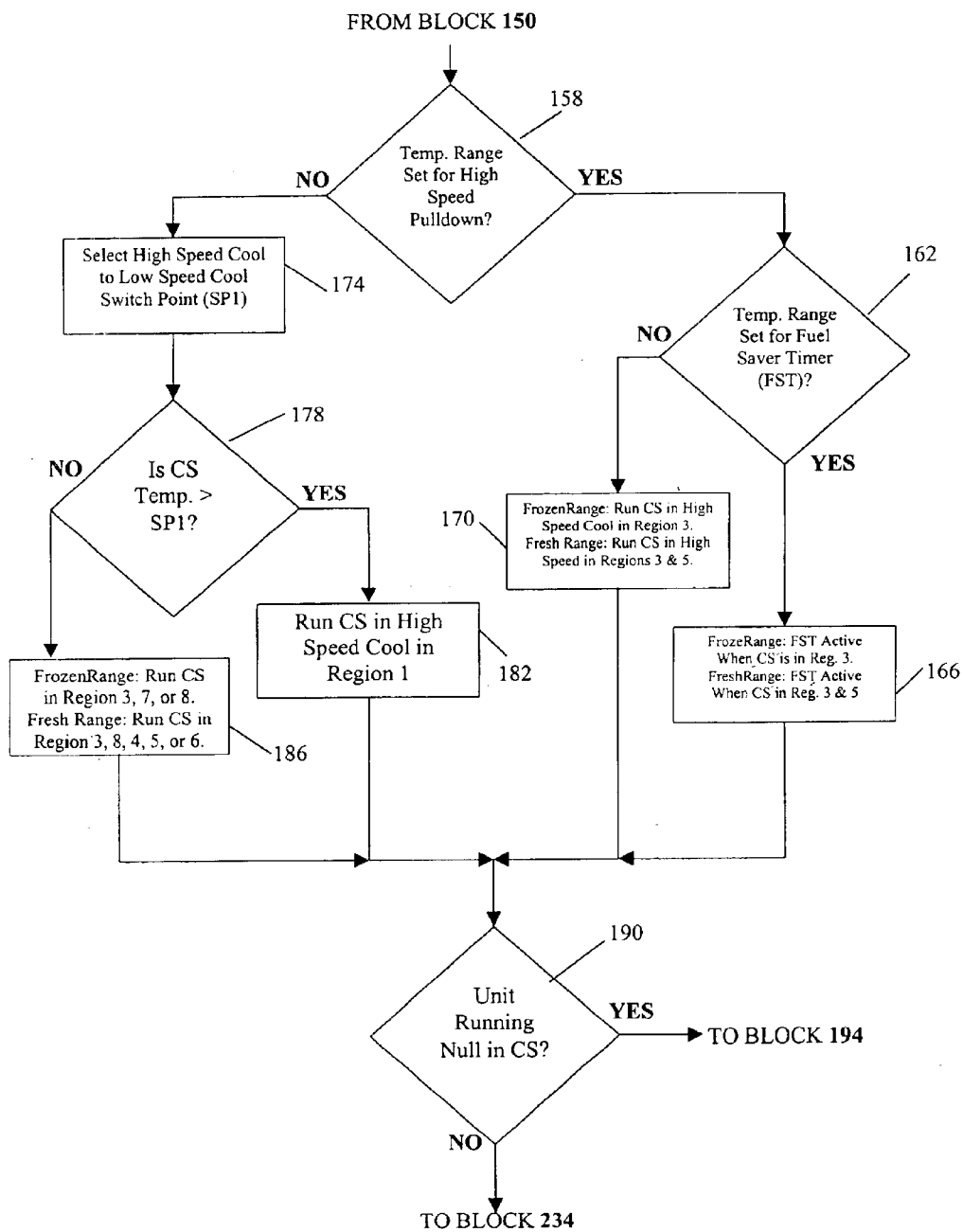

Referring to FIG. 1e and block 158, if the end user selects high speed pulldown for the temperature range (YES at block 158), the program proceeds to block 162 where the program determines if the end user selects FST for the temperature range. If the program determines that the end user selects FST for the temperature range (YES at block 162), the program proceeds to block 166. If the temperature range is a frozen temperature range, the FST is active when the temperature in the conditioned space is in region 3 of the temperature control chart illustrated in FIG. 8 (discussed in greater detail below). If the temperature range is a fresh temperature range, the FST is active when the temperature in the conditioned space is in regions 3 and 5 of the temperature control chart illustrated in FIG. 9 (discussed in greater detail below).

Referring back to block 162, if the program determines that the end user did not select FST for the temperature range (NO at block 162), the program proceeds to block 170. If the temperature range is a frozen temperature range, the unit will run in high speed cool in the conditioned space when the temperature in the conditioned space is in region 3 of the temperature control chart illustrated in FIG. 8 (discussed in greater detail below). If the temperature range is a fresh temperature range, the unit will run in high speed in the conditioned space when the temperature in the conditioned space is in regions 3 and 5 of the temperature control chart illustrated in FIG. 9 (discussed in greater detail below). Without the FST, the unit runs immediately in high speed and does not initiate the eight minute timer or run in low speed.

Referring back to block 158, if the program determines that the end user did not select high speed pulldown for the temperature range (NO at block 158), the program proceeds to block 174 where SP1 is selected by the end user. After block 174, the program proceeds to block 178 where the program determines if the temperature in the conditioned space is greater than SP1. If the temperature in the conditioned space is greater than SP1 (YES at block 178), the program proceeds to block 182 where the unit will run in high speed cool when the temperature in the conditioned space is in region 1 of temperature control charts illustrated in FIGS. 8 and 9 (discussed in greater detail below) for both fresh and frozen temperature ranges, respectively.

Referring back to block 178, if the temperature in the conditioned space is not greater than SP1 (NO at block 178), the program proceeds to block 186. If the temperature range is a frozen temperature range, the unit will be controlled in regions 3, 7, or 8 of the temperature control chart illustrated in FIG. 8 (discussed in greater detail below) depending on which region the temperature in the conditioned space is in. If the temperature range is a fresh temperature range, the unit will be controlled in regions 3, 8, 4, 5, or 6 of the temperature control chart illustrated in FIG. 9 (discussed in greater detail below) depending on which region the temperature in the conditioned space is in. After blocks 166, 170, 182 and 186, the program proceeds to block 190. At block 190, the program determines if the unit is running null in the conditioned space. Running null implies that the unit is running, but the conditioned space is no longer being cooled or heated by the unit. If the unit is running null in the conditioned space (YES at block 190), the program proceeds to block 194 where a running null restart temperature (RNRT) is selectable by the end user.

Figure 1F:
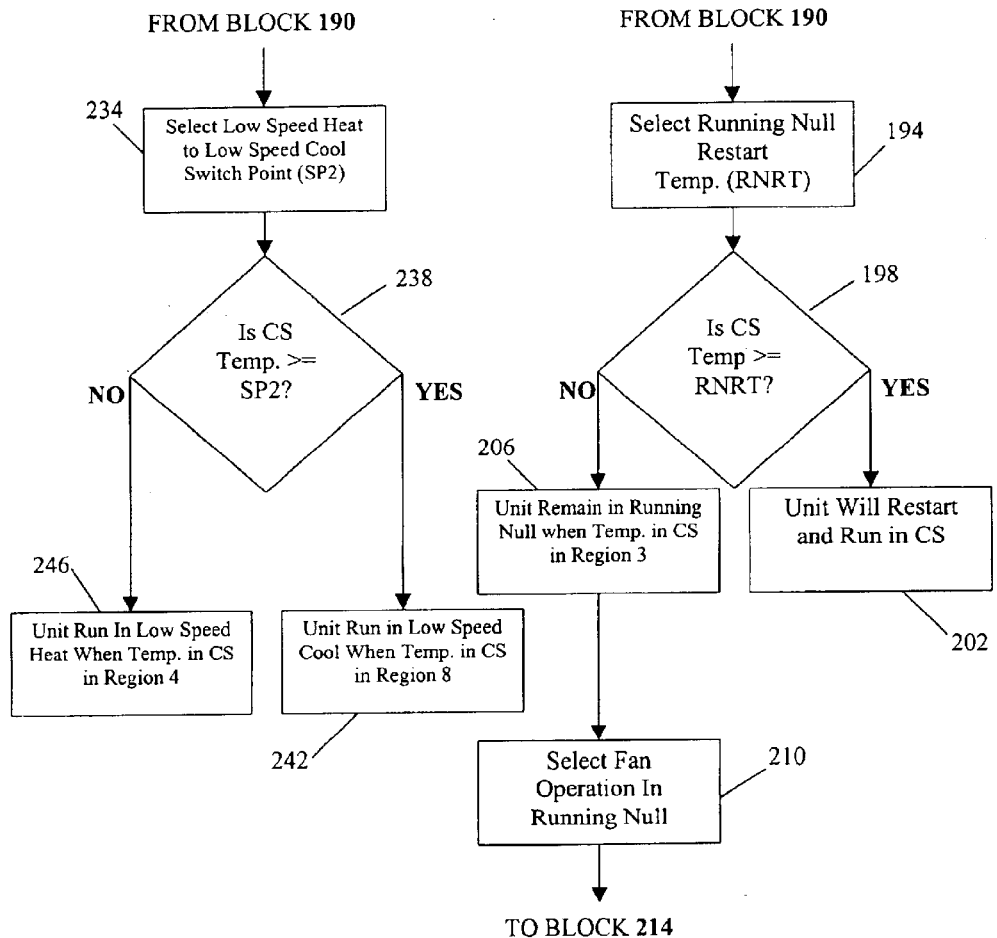

Referring to FIG. 1f and block 194, the RNRT is a temperature in which the conditioned space will begin to be cooled or heated by the unit after the unit has been running null in the conditioned space. Prior to the temperature in the conditioned space reaching the RNRT, the unit is running null in the conditioned space, or in other words, the conditioned space is not being cooled or heated by the unit while the unit is running. When the temperature in the conditioned space reaches the RNRT, the unit will restart in the conditioned space and begin to cool or heat the conditioned space. After block 194, the program proceeds to block 198 where the program determines if the temperature in the conditioned space is greater than or equal to the RNRT. If the temperature in the conditioned space is greater than or equal to the RNRT (YES at block 198), the program proceeds to block 202 where the unit will restart in the conditioned space and begin to cool or heat the conditioned space.

Referring back to block 198, if the temperature in the conditioned space is not greater than or equal to the RNRT (NO at block 198), the program will proceed to block 206 where the unit will continue running null in the conditioned space when the temperature in the conditioned space is in region 3 of the temperature control charts illustrated in FIGS. 8 and/or 9 (discussed in greater detail below).

Next, the program proceeds to block 210 where fan operations for the temperature range are selected while the conditioned space is running null. The fan operations are selectable by the end user. After block 210, the program proceeds to block 214 where the program determines if the end user selects fans to cycle for the temperature range.

Figure 1G:
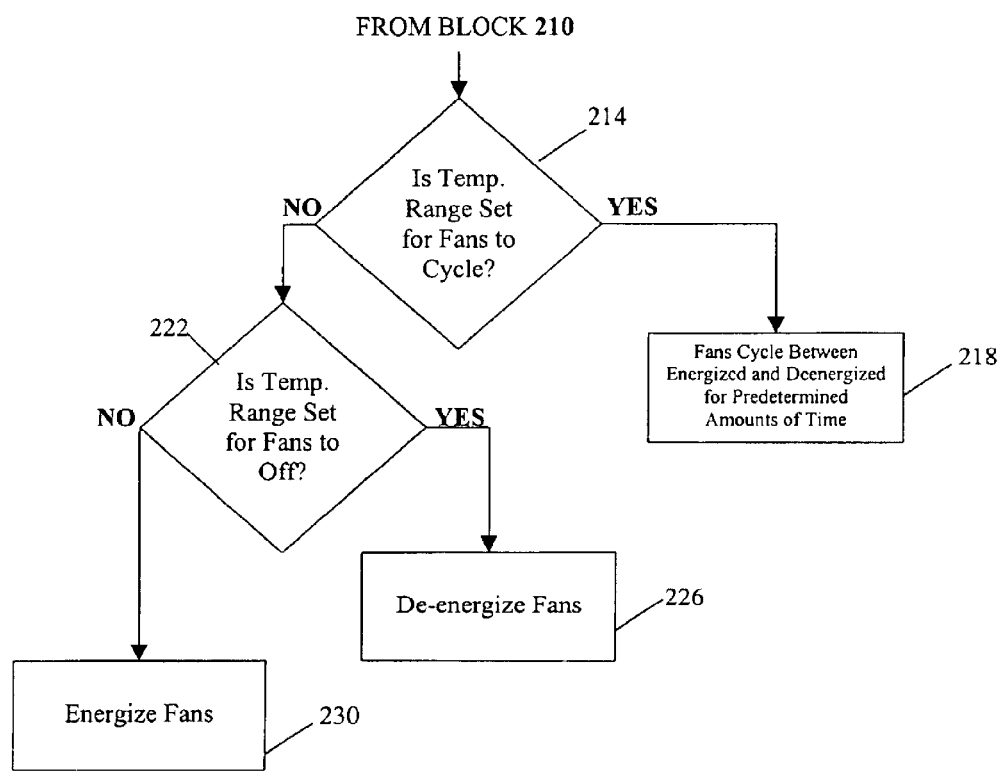

Referring to FIG. 1g and block 214, if the program determines that the end user selects fans to cycle for the temperature range (YES at block 214), the program proceeds to block 218 where the fans energize and de-energize for predetermined amounts of time. In the present invention, the fans repeat between energizing for three minutes and de-energizing for three minutes until the fans are no longer required to energize and de-energize. However, the fan may energize and de-energize for any amount of time and still be within the scope of the present invention.

Referring back to block 214, if the program determines that the end user did not select fans to cycle for the temperature range (NO at block 214), the program proceeds to block 222 where the program determines if the end user selects fans to off for the temperature range. If the program determines that the end user selects fans to off for the temperature range (YES at block 222), the program proceeds to block 226 where the fans are de-energized in the conditioned space. Referring back to block 222, if the program determines that the end user did not select fans to off for the temperature range (NO at block 222), the program proceeds to block 230 where the fans are energized in the conditioned space.

Referring back to FIG. 1e and block 190, if the unit is not running null in the conditioned space (NO at block 190), the program proceeds to block 234 where a low speed heat to low speed cool switch point (SP2) is selectable by the end user.

Referring to FIG. 1f and block 234, SP2 enables tight temperature control about the desired thermal setpoint. SP2 is a temperature set a predetermined amount above the desired thermal setpoint (usually a small amount to ensure that the temperature in the conditioned space remains relatively close to the thermal setpoint) and determines if the unit is running in low speed cool or low speed heat within the conditioned space. Typically, the unit will run in low speed heat until the temperature in the conditioned space reaches SP2. Upon reaching SP2, the unit will switch to low speed cool. The unit will run in low speed cool until the temperature in the conditioned space reaches the thermal setpoint. Upon reaching the thermal setpoint, the unit will switch from low speed cool to low speed heat. The unit will continue to switch between low speed cool and low speed heat until this option is no longer desired. After block 234, the program proceeds to block 238 where the program determines if the temperature in the conditioned space is greater than or equal to SP2. If the temperature in the conditioned space is greater than or equal to SP2 (YES at block 238), the program will proceed to block 242 where the unit will run in low speed cool when the temperature in the conditioned space is in region 8 of the temperature control chart illustrated in FIG. 9 (discussed in greater detail below). Referring back to block 238, if the temperature in the conditioned space is not greater than or equal to SP2 (NO at block 238), the program proceeds to block 246 where the unit will run in low speed heat when the temperature in the conditioned space is in region 4 of the temperature control chart illustrated in FIG. 9 (discussed in greater detail below).

Briefly stated, the main routine illustrates the selectable operations possible for each programmable temperature range that are selectable by the end user and/or a secondary user.

Figure 2A:
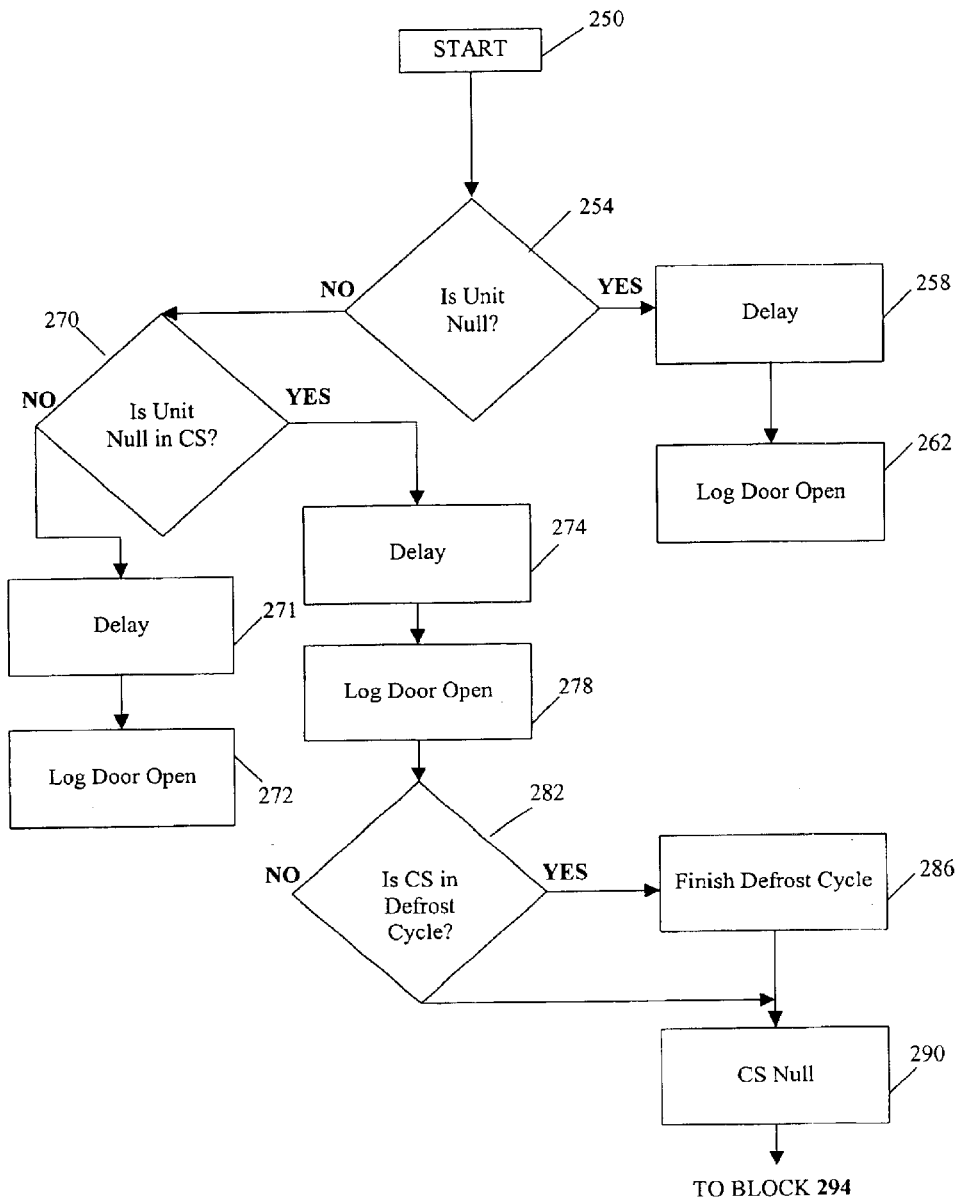
FIGS. 2a and 2b are flow charts showing a door interrupt routine of the method of controlling a transport temperature control unit having cooling and heating cycles for cooling and heating a conditioned space.
Figure 2B:
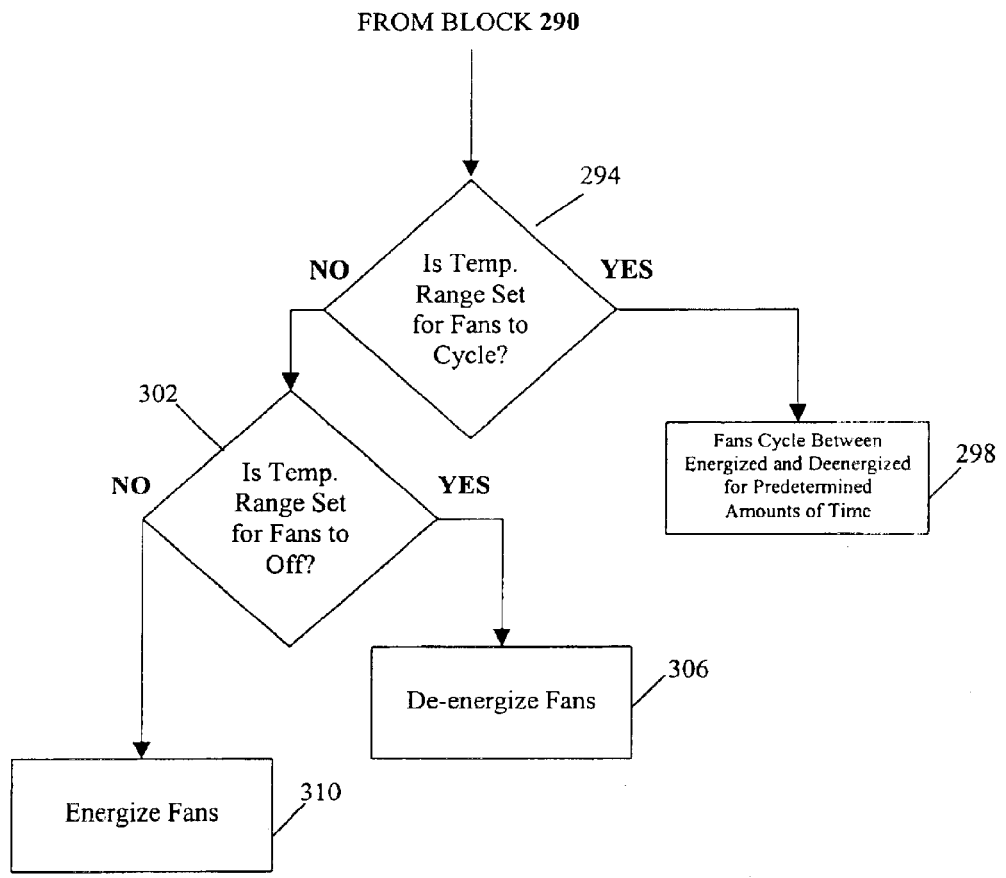

FIGS. 2a and 2b illustrate the door interrupt routine of the program. As noted above, the door interrupt routine can be called into the main routine and execute any time a door on the transport vehicle is opened to the conditioned space or to any conditioned space if the transport vehicle has a plurality of conditioned spaces.

As seen in FIG. 2a, the door interrupt routine starts at block 250 when a door is opened to a conditioned space. At block 254, the program determines if the temperature control unit is null. The unit is null when the unit and the motor of the unit are completely off. Unlike running null where the unit is running or on and the condition space is not being cooled or heated, the unit is completely off when the unit is null. If the unit is null (YES at block 254), the program proceeds with a delay at block 258. The delay occurs directly after the door is opened and delays additional operations from being performed. In the preferred embodiment, the delay is two seconds, however, the delay may be any amount of time and still be within the scope of the present invention. After the delay, the program proceeds to block 262 where the door is logged open. The time of day and the date are typically logged when a door is opened.

Referring back to block 254, if the temperature control unit is not null (NO at block 254), the program proceeds to block 270 where the program determines if the unit is null just for the conditioned space (otherwise known as unit running null). This is different from the unit being null because the unit is running, but it may not be cooling or heating the conditioned space. If the unit is null in the conditioned space (YES at block 270), the program proceeds to a delay at block 274. The delay occurs directly after the door is opened and delays additional operations from being performed. Again, in the preferred embodiment, the delay is two seconds, however, the delay may be any amount of time and still be within the scope of the present invention. Next, the program proceeds to block 278 where the door is logged open. After block 278, the program proceeds to block 282 where the program determines if the conditioned space is in a defrost cycle. If the conditioned space is in a defrost cycle (YES at block 282), the program proceeds to block 286 where the defrost cycle is allowed to complete in the conditioned space. Next, the program proceeds to block 290 where the unit is null in the conditioned space.

Referring back to block 282, if the conditioned space is not in the defrost cycle (NO at block 282), the program proceeds to block 290 where the unit is null in the conditioned space.

Referring to FIG. 2*b,* after the program proceeds from blocks 282 and 286 to block 290, the program proceeds from 290 to block 294 where the program determines if the end user selects fans to cycle for the temperature range. If the program determines that the end user selects fans to cycle for the temperature range (YES at block 294), the program proceeds to block 298 where the fans energize and de-energize for predetermined amounts of time. In the present invention, the fans repeat between energizing for three minutes and de-energizing for three minutes until the fans are no longer required to energize and de-energize. However, the fans may energize and de-energize for any amount of time and still be within the scope of the present invention.

Referring back to block 294, if the program determines that the end user did not select fans to cycle for the temperature range (NO at block 294), the program proceeds to block 302 where the program determines if the end user selects fans to off for the temperature range. If the program determines that the end user selects fans to off for the temperature range (YES at block 302), the program proceeds to block 306 where the fans are de-energized in the conditioned space. Referring back to block 302, if the program determines that the end user did not select fans to off for the temperature range (NO at block 302), the program proceeds to block 310 where the fans are energized in the conditioned space.

Referring back to FIG. 2*a* and block 270, if the unit is not null in the conditioned space (NO at block 270), the program proceeds to a delay at block 271. The delay is similar to the other delays discussed above and illustrated at blocks 258 and 274. Next, the program proceeds to block 272 where the door is logged open.

Figure 3:
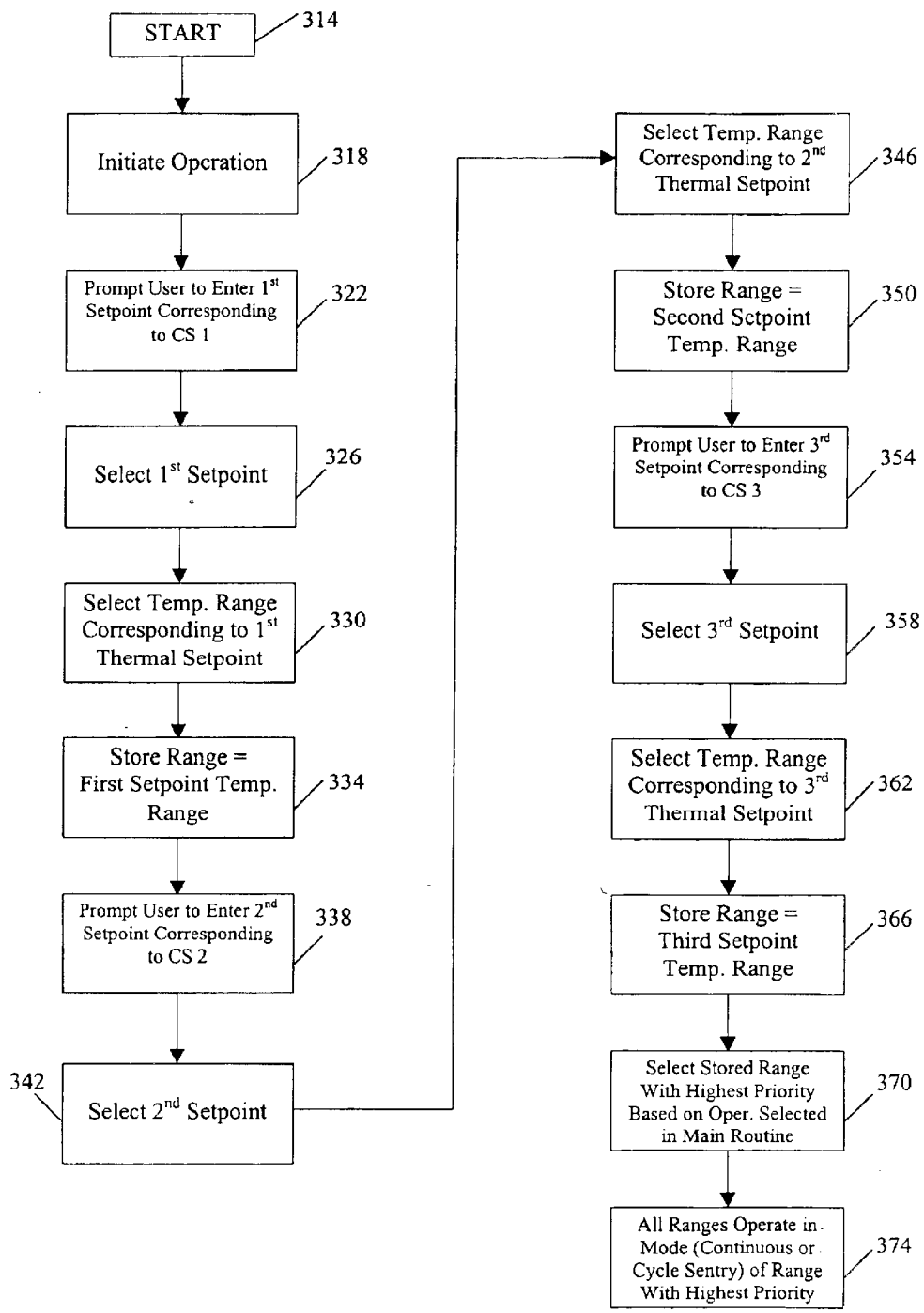
FIG. 3 is a flow chart showing an operation routine of the method of controlling a transport temperature control unit having cooling and heating cycles for cooling and heating a conditioned space.

FIG. 3 illustrates the operation routine of the present invention. The operation routine occurs after all operations of the temperature ranges have been selected by the end user (as discussed above in the main routine) and the conditioned space is being prepared to hold cargo for potential transportation on the transport vehicle. The operation routine is typically executed by the program in combination with inputs or selections from the secondary user. The operation routine may also be performed by a mechanical, electrical and/or a computer operated machine or hardware that interconnects with the temperature control unit and performs the operation routine. For explanation purposes, for example only, the operation routine includes first, second and third conditioned spaces within the transport vehicle. Each conditioned space can operate independently of one another. The operations of the conditioned spaces are based on the selected operations of the temperature ranges that are selected to control the respective conditioned spaces.

Referring to FIG. 3, the operation routine starts at block 314. At block 318, the program initiates operation. The initiation of the operation routine may include, but is not limited to turning the unit on, powering-up the unit, checking for errors in the unit, and any other initializing sequences that occur during start-up. After block 318, the program proceeds to block 322 where the secondary user is prompted to enter a first thermal setpoint corresponding to the first conditioned space. The first thermal setpoint is a temperature that is desirable for the first conditioned space to be maintained at. The first thermal setpoint will be determined according to the cargo being transported within the first conditioned space. The first thermal setpoint will be a temperature below freezing if the cargo must be frozen or the first thermal setpoint will be a temperature above freezing if the cargo must remain unfrozen. Next, the program proceeds to block 326 where the program selects or reads-in the first thermal setpoint entered by the secondary user. The program then proceeds to block 330 where the program selects a programmable temperature range in which the first thermal setpoint lies within. For example, if the first thermal setpoint is 42° F., the corresponding temperature range may range between the temperatures 40° F. and 50° F. The operations of the selected temperature range will depend on how the operations of that temperature range were selected in the main routine of the program. Next, the program proceeds to block 334 where the program stores the temperature range that corresponds with the first thermal setpoint as the first thermal setpoint temperature range.

After block 334, the program proceeds to block 338 where the secondary user is prompted to enter a second thermal setpoint corresponding to the second conditioned space. The second thermal setpoint is a temperature that is desirable for the second conditioned space to be maintained at. Next, the program proceeds to block 342 where the program selects or reads-in the second thermal setpoint entered by the secondary user. The program then proceeds to block 346 where the program selects a programmable temperature range in which the second thermal setpoint lies within. The program selects this programmable temperature range in much the same fashion as the first thermal setpoint temperature range is selected. The temperature range corresponding to the second thermal setpoint may be the same temperature range as the temperature range that corresponds to the first thermal setpoint or the temperature range corresponding to the second thermal setpoint may be a different temperature range. Next, the program proceeds to block 350 where the program stores the temperature range that corresponds with the second thermal setpoint as the second thermal setpoint temperature range.

After block 350, the program proceeds to block 354 where the program prompts the secondary user to enter a third thermal setpoint corresponding to the third conditioned space. The third thermal setpoint is a temperature that is desirable for the third conditioned space to be maintained at. The program then proceeds to block 358 where the program selects or reads-in the third thermal setpoint entered by the secondary user. After block 358, the program proceeds to block 362 where the program selects a programmable temperature range in which the third thermal setpoint lies within. The program selects this programmable temperature range in much the same fashion as the first and second thermal setpoint temperature ranges are selected. The temperature range corresponding to the third thermal setpoint may be the same temperature range as either or both of the temperature ranges that correspond to the first and/or second thermal setpoints or the temperature range corresponding to the third thermal setpoint may be a different temperature range than both the temperature ranges corresponding to the first and second thermal setpoint. Next, the program proceeds to block 366 where the program stores the temperature range corresponding to the third thermal setpoint as the third thermal setpoint temperature range.

After block 366, the program proceeds to block 370 where the program selects the setpoint temperature range with the highest priority. As noted above, the priority of each temperature range is selected in the main routine of the program. The program selects between the stored first, second and third thermal setpoint temperature ranges. After block 370, the program continues to block 374 where the first, second and third conditioned spaces operate in cycle mode or continuous mode (the cycle/continuous select mode will eventually operate in cycle mode or continuous mode depending on the mode that the secondary user selects) depending on the unit control mode selected for the temperature range with the highest priority. Each of the stored temperature ranges with lower priority than the temperature range with the highest priority maintain all of their operations (i.e. high speed pull down, SP1, FST, SP2, fan operations, door switch options, etc.) selected in the main routine of the program, except they operate in the unit control mode (cycle or continuous) of the temperature range with the highest priority. All temperature ranges are operated in the same unit control mode because the temperature control unit (or in other words, the engine) can only operate in one mode, continuous mode or cycle mode. For example, if the temperature range with the highest priority operates in the cycle mode, the other two temperature ranges corresponding to the other two conditioned spaces will operate in cycle mode even if they are set for continuous mode or cycle continuous select mode.

In the forgoing description, the end user and the secondary user have been described as having various and separate duties, however, the end user and the secondary user may be a single user and perform all of the duties for both the end user and the secondary user and still be within the scope of the present invention. Also, any number of the various and separate duties described for the end user and the secondary user may be performed by the other of the end user and the secondary user and still be within the scope of the present invention.

Figure 4:
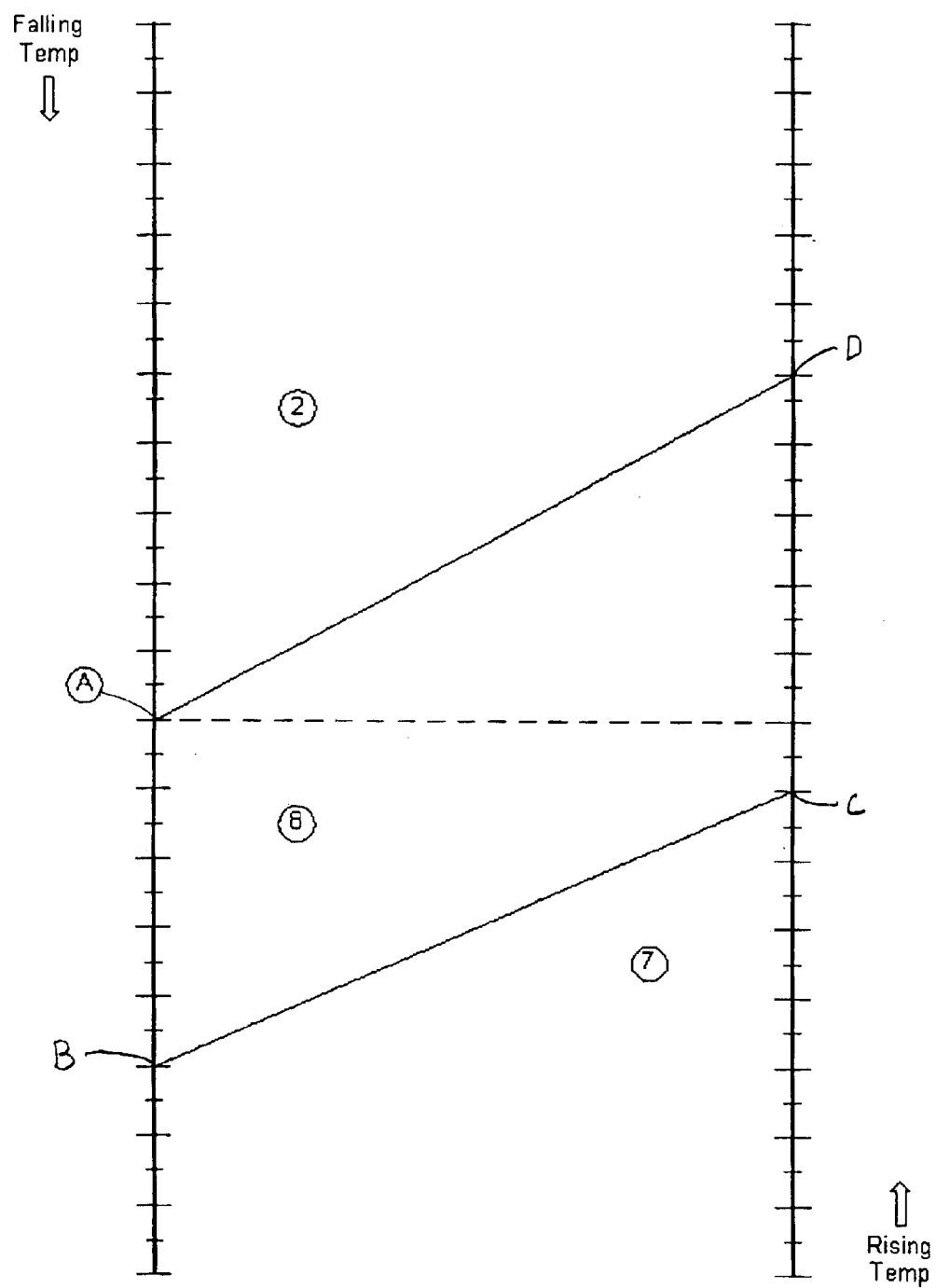
FIG. 4 is a temperature control chart representing temperature control when the programmable temperature range is a frozen range and economy mode is selected by an end user as the unit control mode for the programmable temperature range.
Figure 5:
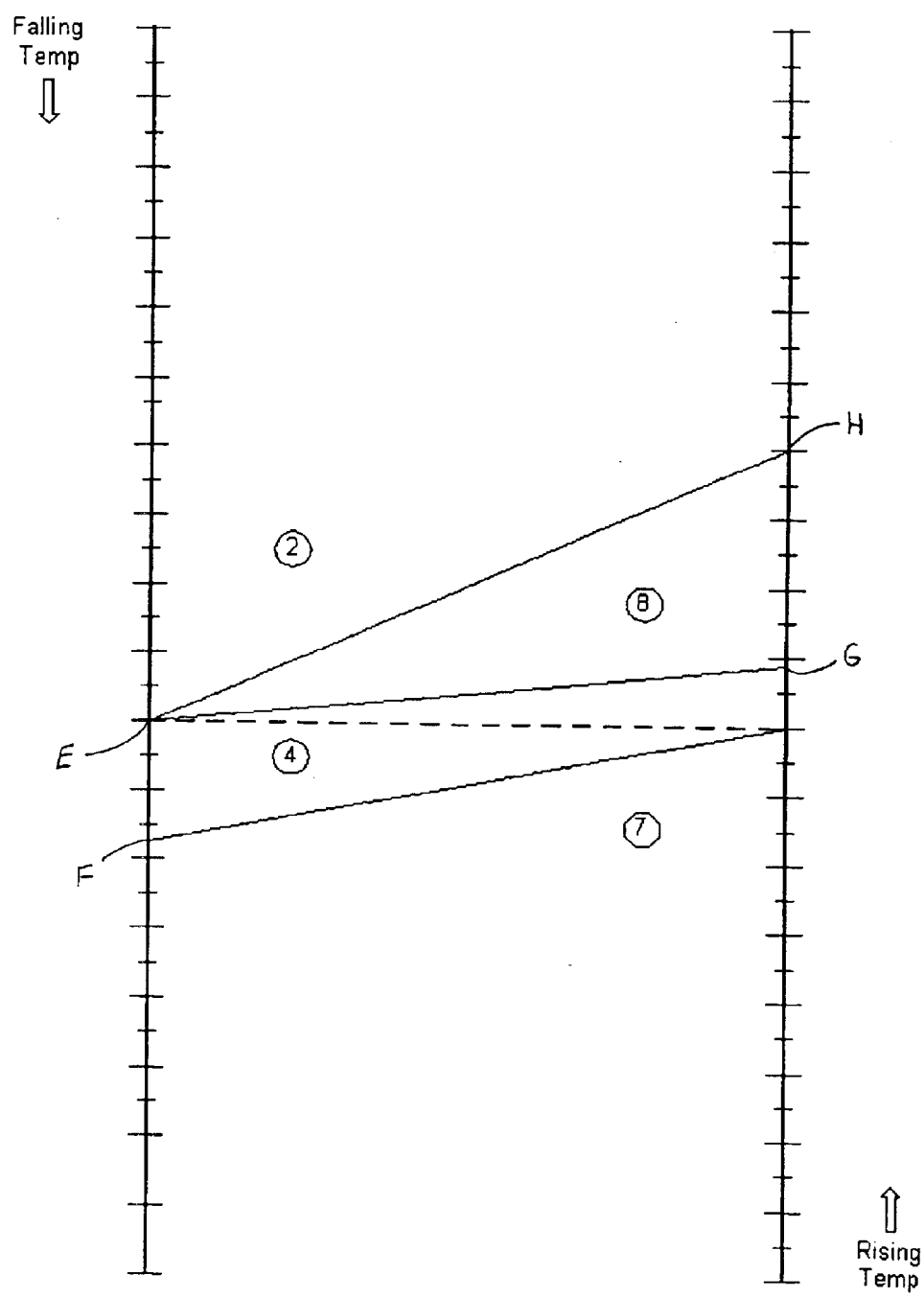
FIG. 5 is a temperature control chart representing temperature control when the programmable temperature range is a fresh range and economy mode is selected by an end user as the unit control mode for the programmable temperature range.

Referring now to FIGS. 4–9, the temperature control charts will be discussed. The temperature control charts illustrated in FIGS. 4–9 are for comprehension purposes and for example purposes only and represent a sample of the many temperature control charts that are possible. For example, a diesel internal combustion engine system or an electric motor system may power the temperature control unit. Both types of powered units have different features and temperature control charts. FIGS. 4 and 5 are examples of temperature control charts for electric powered units and FIGS. 6–9 are examples of temperature control charts for diesel powered units. The temperature control charts indicate the operation of the unit within the conditioned space when the temperature in the conditioned space is at various temperatures. As noted above, a programmable temperature range is selected for each conditioned space within the transport vehicle. The unit is controlled within each conditioned space according to the operations selected in the main routine of the program. For example, if a programmable temperature range is a fresh range and is selected to operate in cycle mode and economy mode, then the temperature control chart illustrated in FIG. 5 will indicate how the unit will be controlled within the conditioned space when the temperature in the conditioned space vanes. The left side of the temperature control charts display a falling temperature scale where higher temperatures are at the top of the scale and lower temperatures are at the bottom of the scale (numerical temperature values not illustrated). The right side of the temperature control charts display a rising temperature scale where lower temperatures are at the bottom of the scale and higher temperatures are at the top of the scale. All the temperature control charts include a thermal setpoint (represented by a horizontal dashed line) and various regions that will be discussed individually with each temperature control chart. The various regions of the temperature control charts indicate what operation the unit will be performing when the temperature in the conditioned space is within a particular region. The divisions between the regions are temperatures that may be pre-programmed or selected by the end user.

Referring to FIG. 4, a temperature control chart is illustrated that represents temperature control when the programmable temperature range is a frozen range, is in economy mode, and is selected to operate in either cycle mode or continuous mode. The thermal setpoint is designated at point A. Region 2 is a control region in which the unit is on and is cooling the temperature within the conditioned space toward thermal setpoint A. In region 8 of the temperature control chart illustrated in FIG. 4, the unit may be null in the conditioned space because the temperature m the conditioned space is an acceptable value. The unit may also be cooling the conditioned space in region 8 for reasons known to those skilled in the art. When the temperature in the conditioned space is within region 7, the unit is heating the conditioned space toward thermal setpoint A. In the preferred embodiment of the present invention, point B is 10° F. below the thermal setpoint, point C is 1° F. below the thermal setpoint, and point D is 10° F. above the thermal setpoint, however, these points may be any temperature above or below the thermal setpoint and still be within the scope of the present invention. Points B and C are temperatures that divide regions 7 and 8. Point D, along with the thermal setpoint A divide regions 2 and 8. As noted above, economy mode has pre-programmed parameters that the end user may not change, therefore, points B, C and D are fixed and can not be varied by the end user.

Referring to FIG. 5, a temperature control chart is illustrated that represents temperature control when the programmable temperature range is a fresh range, is selected to operate in either cycle mode or continuous mode; and is in economy mode. Region 2 is a control region in which the unit is on and is cooling the temperature within the conditioned space toward thermal setpoint E. If the temperature in the conditioned space is in region 4, the unit may be null because the temperature within the conditioned space is at an acceptable temperature. The unit may also be heating the conditioned space in region 4 for reasons known to those skilled in the art. If the temperature in the conditioned space is in region 7, the unit is running or on and is heating the conditioned space toward thermal setpoint E. If the temperature in the conditioned space is in region 8, the unit may be null because the temperature within the conditioned space is an acceptable temperature. The unit may also be on or cooling the conditioned space in region 8 for reasons known to those skilled in the art. In the preferred embodiment of the present invention, point F is 3.5° F. below the thermal setpoint, point G is 1.70° F. above the thermal setpoint, and point H is 8° F. above the thermal setpoint, however, these points may be any temperature above or below the thermal setpoint and still be within the scope of the present invention. Point F along with the thermal setpoint E divide regions 4 and 7. The thermal setpoint E and point G divide regions 4 and 8. The thermal setpoint E and point H divide regions 2 and 8. As noted above, economy mode has pre-programmed parameters that the end user may not change, therefore, points F, G and H are fixed according to the pre-programmed operations and can not be varied by the end user.

Referring to FIG. 6, a temperature control chart is illustrated that represents temperature control when the programmable temperature range is a frozen range and is selected to operate in cycle mode. If the temperature in the conditioned space is in region 1 of the temperature control chart, the unit is running or on and is cooling the conditioned space in high speed. If the temperature is in region 3, the unit is on and is cooling the conditioned space. In region 3, the unit may be cooling the conditioned space in high speed or in low speed and the FST may be activated if selected for the programmable temperature range (see block 78 of FIG. 1c). Determination of whether the unit operates in high speed or low speed depends on what operations were selected by the end user for the programmable temperature range. If the end user selected the high speed pulldown operation (see block 74 of FIG. 1c) for the programmable temperature range then the unit will cool in high speed while the temperature in the conditioned space is in region 3. However, if the end user did not select the high speed pulldown operation for the programmable temperature range, the unit will cool the conditioned space in low speed while the temperature is in region 3. The point at which the unit may switch from high speed to low speed and that sets a barrier between region 1 and region 3 is SP1, which may be selected by the end user. In region 8 of the temperature control chart illustrated in FIG. 6, the unit may be null in the conditioned space because the temperature in the conditioned space is an acceptable temperature. The unit may also be cooling the conditioned space in region 8 for reasons known to those skilled in the art. When the temperature in the conditioned space is within region 7, the unit is heating the conditioned space toward thermal setpoint I. In the preferred embodiment of the present invention, SP1 is a variable temperature that may be selected by the end user, point J is 0.5° F. below the thermal setpoint I, point K is 5° F. below the thermal setpoint I, point NRT is a variable temperature that may be selected by the end user and determines at what temperature the unit will restart from null in the conditioned space, and point L is a variable temperature that may be selected by the end user and may determine at what temperature the unit switches from low speed cool to high speed cool, however, these points may be any temperature above or below the thermal setpoint and still be within the scope of the present invention. SP1 and point L are temperatures that divide regions 1 and 3. Points J and NRT are temperatures that divide regions 3 and 8. Point K, along with the thermal setpoint I divide regions 7 and 8.

Referring to FIG. 7, a temperature control chart is illustrated that represents temperature control when the programmable temperature range is a fresh range and is selected to operate in cycle mode. If the temperature in the conditioned space is in region 1 of the temperature control chart, the unit is running or on and is cooling the conditioned space in high speed. If the temperature is in region 3, the unit is on and is cooling the conditioned space. In region 3, the unit may be cooling the conditioned space in high speed or in low speed and the EST may be activated if selected for the programmable temperature range (see block 78 of FIG. 1c). Determination of whether the unit operates in high speed or low speed in region 3 is similar to the reasons discussed above for the temperature control chart illustrated in FIG. 6. If the temperature in the conditioned space is in region 4, the unit may be null because the temperature within the conditioned space is at an acceptable temperature. The unit may also be heating the conditioned space in region 4 for reasons known to those skilled in the art. If the temperature is in region 5, the unit is on and is heating the conditioned space. In region 5, the unit may be heating the conditioned space in high speed or in low speed and the FST may be activated if selected for the programmable temperature range (see block 78 of FIG. 1c). Determination of whether the unit operates in high speed or low speed depends on what operations were selected by the end user for the programmable temperature range. If the end user selected the high speed pulldown operation (see block 74 of FIG. 1c) for the programmable temperature range, the unit will heat in high speed while the temperature in the conditioned space is in region 5. However, if the end user did not select the high speed pulldown operation for the programmable temperature range, the unit will heat the conditioned space in low speed while the temperature is in region 5. If the temperature of the conditioned space is in region 6, the unit will be heating the conditioned space in high speed toward the thermal set point M. If the temperature in the conditioned space is in region 8, the unit may be null in the conditioned space because the temperature may be an acceptable temperature. The unit may also be cooling the conditioned space in region 8 for reasons known to those skilled in the art. In the preferred embodiment of the present invention, SP1' is a variable temperature that may be selected by the end user and determines at what temperature the unit will switch from high speed cool to low speed cool, point N is 3.5° F. below the thermal setpoint M, point O is 7° F. below the thermal setpoint M, point P is 3.5° F. below the thermal setpoint M, point Q is 1.7° F. above the thermal setpoint M, point NRT' is a variable temperature that may be selected by the end user and determines at what temperature the unit will restart in the conditioned space., and point R is a variable temperature that may be selected by the end user and may determine at what temperature the unit switches from low speed cool to high speed cool, however, these points may be any temperature above or below the thermal setpoint and still be within the scope of the present invention. SP1 and point R are temperatures that divide regions 1 and 3. The thermal setpoint M and point NRT' are temperatures that divide regions 3 and 8. The thermal setpoint M and point Q are temperatures that divide regions 4 and 8. Points N and the thermal setpoint M are temperatures that divide regions 4 and 5. Point O and point P are temperatures that divide regions 5 and 6.

Figure 8:
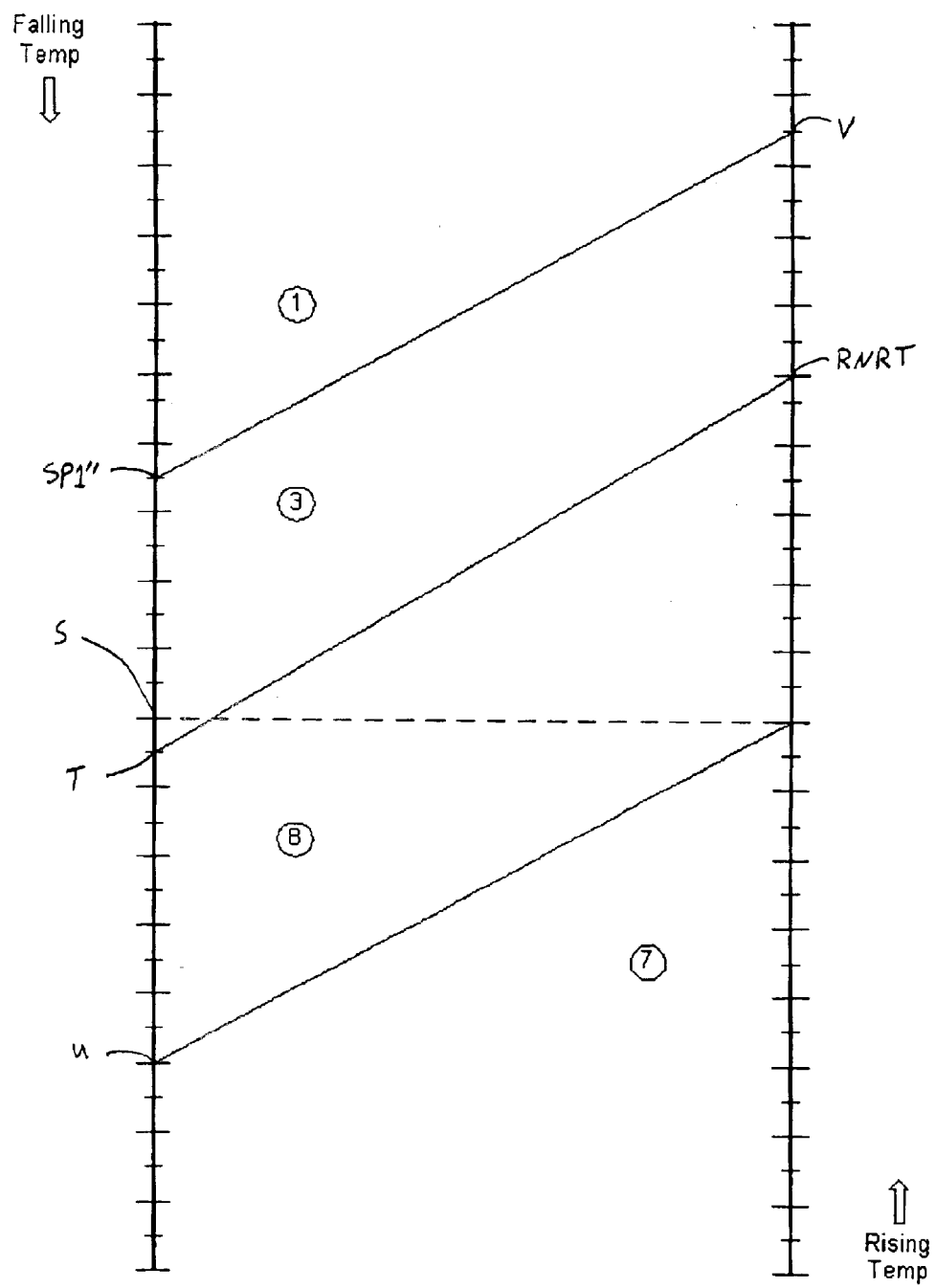
FIG. 8 is a temperature control chart representing temperature control when the programmable temperature range is a frozen range and continuous mode is selected by an end user as the unit control mode for the programmable temperature range.

Referring to FIG. 8, a temperature control chart is illustrated that represents temperature control when the programmable temperature range is a frozen range and is selected to operate in continuous mode. If the temperature in the conditioned space is in region 1 of the temperature control chart, the unit is running or on and is cooling the conditioned space in high speed. If the temperature is in region 3, the unit is on and is cooling the conditioned space. In region 3, the unit may be cooling the conditioned space in high speed or in low speed and the FST may be activated if selected for the programmable temperature range (see block 78 of FIG. 1c). Determination of whether the unit operates in high speed or low speed in region 3 is similar to the reasons discussed above for the temperature control chart illustrated in FIG. 6. In region 8 of the temperature control chart illustrated in FIG. 8, the unit may be null in the conditioned space because the temperature within the conditioned space is an acceptable temperature. The unit may also be cooling the conditioned space in region 8 for reasons known to those skilled in the art. When the temperature in the conditioned space is within region 7, the unit is heating the conditioned space toward thermal setpoint S. In the preferred embodiment of the present invention, SP1" is a variable temperature that may be selected by the end user and determines at what temperature the unit may switch from high speed cool to low speed cool in the conditioned space, point T is 0.5° F. below the thermal setpoint S, point U is 5° F. below the thermal setpoint S, point RNRT is a variable temperature that may be selected by the end user and determines at what temperature the unit will restart in the conditioned space, and point V is a variable temperature that the end user may select and determines at what temperature the unit will switch from low speed cool to high speed cool, however, these points may be any temperature above or below the thermal setpoint and still be within the scope of the present invention. SP1" and point V are temperatures that divide regions 1 and 3. Points T and RNRT are temperatures that divide regions 3 and 8. Point U, along with the thermal setpoint S are temperatures that divide regions 7 and 8.

Figure 9:
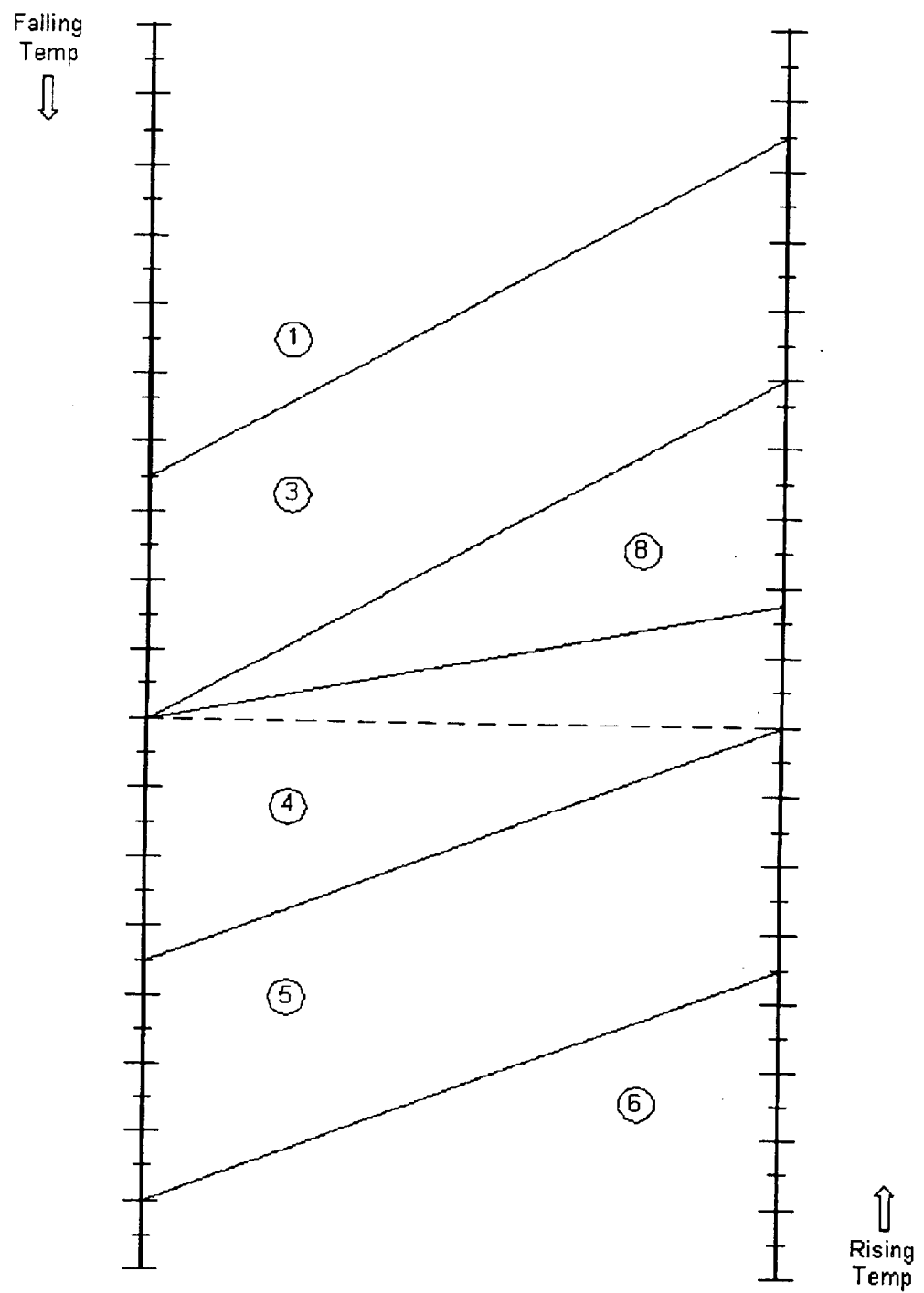
FIG. 9 is a temperature control chart representing temperature control when the programmable temperature range is a fresh range and continuous mode is selected by an end user as the unit control mode for the programmable temperature range.

Referring to FIG. 9, a temperature control chart is illustrated that represents temperature control when the programmable temperature range is a fresh range and is selected to operate in continuous mode. The temperature control chart illustrated in FIG. 9 contains all of the same numbered regions as the temperature control chart illustrated in FIG. 7. Therefore, the unit operates similarly in the regions having the same numbers of the temperature control chart illustrated in FIG. 9 and the temperature control chart illustrated in FIG. 7.

The temperature control charts illustrated in FIGS. 4–9 and the regions described and illustrated therein are for example purposes only, and therefore, are not meant to be limiting. Unit operations within the regions may be different from the operations described above and still be within the scope of the present invention.

Figure 10:
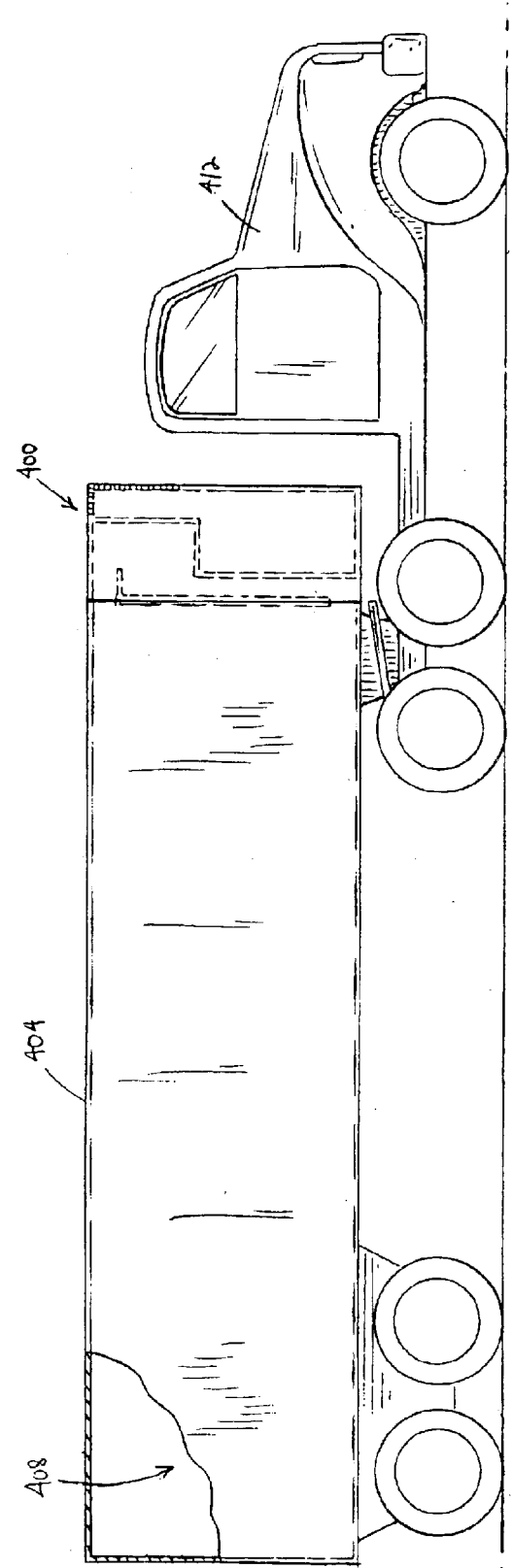
FIG. 10 is a side view, partially in section, of a vehicle having a temperature control unit embodying the present invention.
Figure 11:
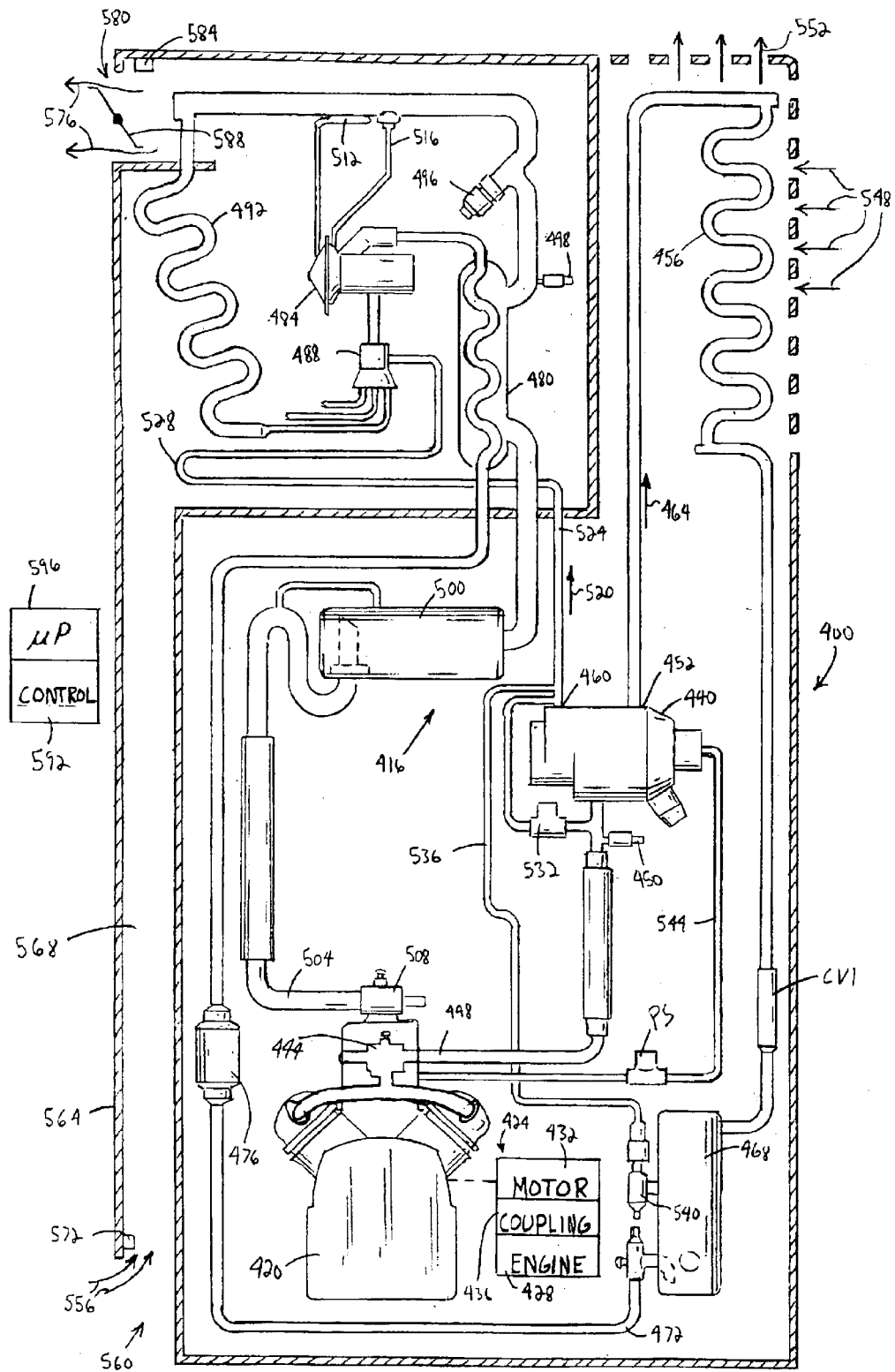
FIG. 11 is a schematic representation of the temperature control unit of FIG. 10.

Referring now to FIGS. 10 and 11, there is shown a temperature control unit 400 that may utilize the present inventive method and apparatus. The temperature control unit 400 is especially suitable for use in transport applications and may be mounted on a container, truck, trailer, or any other type of transport vehicle that has a conditioned space that needs to maintain a predetermined temperature to preserve the quality of the cargo. FIG. 10 shows the unit 400 mounted on a trailer 404 having a conditioned space 408. The trailer is pulled by a tractor 412, as is understood by those skilled in the art.

The temperature control unit 400 controls the temperature in the conditioned space 408 to a specified temperature range adjacent to a selected thermal setpoint. The conditioned space 408 may also be divided into a plurality of conditioned spaces having the temperatures in each conditioned space being substantially independently controlled by the temperature control unit 400. As seen in FIG. 11, the temperature control unit 400 has a closed fluid refrigerant circuit or flow path 416 that includes a refrigerant compressor 420 driven by a prime mover arrangement 424. The prime mover arrangement 424 of the preferred embodiment includes an internal combustion engine 428 and an optional stand-by electric motor 432. The engine 428 and the motor 432, when both are utilized, are coupled to the compressor 420 by a suitable clutch or coupling 436 which disengages the engine 428 while the motor 432 is operative.

Discharge ports of the compressor 420 are connected to an inlet port of a three-way valve 440 via a discharge service valve 444 and a discharge line 448. A discharge pressure transducer 450 is located in the discharge line 448, upstream of the three-way valve 440, to measure the discharge pressure of the compressed refrigerant. The functions of the three-way valve 440, which selects heating and cooling cycles, may be provided by two separate valves, if desired. The three-way valve 440 has a first outlet port 452, which is selected to initiate a cooling cycle, with the first outlet port 452 being connected to the inlet side of a condenser coil 456. The three-way valve 440 has a second outlet port 460, which is selected to initiate a heating cycle.

When the three-way valve 440 selects the cooling cycle outlet port 452, it connects the compressor 420 in a first refrigerant flow path 464, which in addition to the condenser coil 456, includes a one-way condenser check valve CV1, a receiver 468, a liquid line 472, a refrigerant drier 476, a heat exchanger 480, an expansion valve 484, a refrigerant distributor 488, an evaporator coil 492, an electronic throttling valve 496, a suction pressure transducer 498, another path through the heat exchanger 480, an accumulator 500, a suction line 504, and back to a suction port of compressor 420 via a suction line service valve 508. The expansion valve 484 is controlled by a thermal bulb 512 and an equalizer line 516.

When the three-way valve 440 selects the heating cycle outlet port 460, it connects the compressor 420 in a second refrigerant flow path 520. The second refrigerant flow path 520 by-passes the condenser coil 456 and the expansion valve 484, connecting the hot gas output of compressor 420 to the refrigerant distributor 488 via a hot gas line 524 and a defrost pan heater 528. A hot gas by-pass solenoid valve 532 may optionally be disposed to inject hot gas into the hot gas line 524 during a cooling cycle. A by-pass or pressurizing line 536 connects the hot gas line 524 to the receiver 468 via by-pass and check valves 540, to force refrigerant from the receiver 468 into an active refrigerant flow path during heating and defrost cycles.

A conduit or line 544 connects the three-way valve 440 to the low pressure side of the compressor 420 via a normally closed pilot solenoid valve PS. When the solenoid valve PS is de-energized and thus closed, the three-way valve 440 is spring biased to select the cooling cycle outlet port 452. When the evaporator coil 492 requires defrosting, and when cargo is being conditioned in the conditioned space 408 requires heat to maintain thermal setpoint, the pilot solenoid valve PS is energized and the low pressure side of the compressor 420 operates the three-way valve 440 to select the heating cycle outlet port 460 to initiate a heating cycle or a defrost cycle.

A condenser fan or blower (not shown), which may be driven by the prime mover arrangement 424, causes ambient air 548 to flow through the condenser coil 456, with the resulting heated air 552 being discharged to the atmosphere. An evaporator fan or blower (not shown), which also may be driven by the prime mover arrangement 424, draws air 556, called "return air", from the conditioned space 408, through an inlet 560 in a bulkhead 564 and up through a bulkhead space 568. The bulkhead 564 preferably runs the entire height of the conditioned space 408. A return air temperature sensor 572 samples the air temperature from the bottom of the conditioned space 408.

The resulting conditioned cooled or heated air 576, called "discharge air", is returned or discharged by a fan (not shown) into the conditioned space 408 via an outlet 580. A discharge air temperature sensor 584 samples the air temperature of the discharge air. During an evaporator defrost cycle, a defrost damper 588 may be operated to close the discharge air path to the conditioned space 408.

The transport temperature control unit 400 is controlled by an electrical control 592 which includes a microprocessor based controller 596 and electrical control circuits and components, including relays, solenoids, and the like. The controller 596 receives input signals from appropriate sensors, including inputs from a thermal setpoint selector (not shown), which may be actuated to select the desired temperature in the conditioned space 408, an ambient air temperature sensor (not shown), the return air temperature sensor 572, the discharge temperature sensor 584, a coil temperature sensor and switch (not shown) disposed to sense the temperature of the evaporator coil 492, the discharge pressure transducer 450, and the suction pressure transducer 498. The controller 596 provides output signals to, among other things, the electronic throttling valve 496 to control the positioning of the electronic throttling valve 496, as described above.

Various features of the invention are set forth in the following claims.

What is claimed is:

1. A method of controlling a transport temperature control unit to maintain a first conditioned space within a transport at a temperature setpoint, the temperature control unit having cooling and heating cycles for cooling and heating the conditioned space, the temperature control unit including a first programmable temperature range, the transport further comprising a second conditioned space and the unit further comprising a second programmable temperature range, the method comprising:

programming into the unit a first pre-programmed control mode for maintaining the temperature setpoint;

configuring the unit such that a second control mode for maintaining the temperature setpoint is programmable into the unit by an end user;

selecting numerical temperature values for the first programmable temperature range, the selection of numerical values being made by the end user;

selecting the first pre-programmed control mode for operation of the first programmable temperature range or to program the second control mode into the unit for operation of the first programmable temperature range, the selection of the first pre-programmed or to program the second control mode being made by the end user;

programming the second control mode into the first programmable temperature range by the end user when the second control mode is desired by the end user;

utilizing one of the first pre-programmed control mode and the second control mode to control the operation of the unit in the second conditioned space with the second programmable temperature range; and selecting a first priority for the first programmable temperature range and a second priority for the second programmable temperature range by the end user.

2. The method as claimed in claim 1, wherein the first programmable temperature range is operable to control the operation of the unit in the first conditioned space by being selectively operable to utilize one of the first pre-programmed control mode and the second control mode.

3. The method as claimed in claim 1, wherein the numerical temperature values include a minimum temperature value and a maximum temperature value.

4. The method as claimed in claim 1, further including the step of programming a unit control mode for the first programmable temperature range.

5. The method as claimed in claim 4, wherein the step of programming a unit control mode for the first programmable temperature range further includes selecting one of a cycle mode, a continuous mode and a cycle/continuous select mode.

6. The method as claimed in claim 4, wherein the unit control mode is one of a cycle mode, continuous mode and a cycle/continuous select mode.

7. The method as claimed in claim 1, wherein the step of programming the second control mode into the first programmable temperature range by the end user when the second control mode is desired by the end user further includes the step of selectively programming a fuel saver timer operable to decrease fuel consumption of the unit.

8. The method as claimed in claim 1, wherein the step of programming control mode into the first programmable temperature range by the end user when the second control mode is desired by the end user further includes the step of programming a high speed cool to low speed cool switch point at which point the unit switches between high speed cool and low speed cool in the first conditioned space.

9. The method as claimed in claim 1, wherein the step of programming the second control mode into the first programmable temperature range by the end user when the second control mode is desired by the end user further includes the step of programming a restart temperature at which temperature the first conditioned space restarts from a null condition.

10. The method as claimed in claim 1, wherein the step of programming the second control mode into the first programmable temperature range by the end user when the second control mode is desired by the end user further includes the step of programming fan operation of the unit in the first conditioned space.

11. The method as claimed in claim 1, wherein the step of programming the second control mode into the first programmable temperature range by the end user when the second control mode is desired by the end user further includes the step of programming a low speed heat to low speed cool switch point at which point the unit switches between low speed heat and low speed cool in the first conditioned space.

12. The method as claimed in claim 1, wherein the step of programming the second control mode into the first programmable temperature range by the end user when the second control mode is desired by the end user further includes the step of programming door switch options by the end user.

13. The method as claimed in claim 1, wherein the first programmable temperature range and the second programmable temperature range are both operable by the first pre-programmed control mode.

14. The method as claimed in claim 1, wherein the programmable temperature range and the second programmable temperature range are both operable by the second control mode.

15. The method as claimed in claim 1, further including the step of selecting a first unit control mode for the first programmable temperature range and a second unit control mode for the second programmable temperature range.

16. The method as claimed in claim 15, wherein the first and second unit control modes are one of a cycle mode, a continuous mode and a cycle/continuous select mode.

17. The method as claimed in claim 16, wherein the first priority and the second priority are different priorities.

18. The method as claimed in claim 17, further including the step of determining which of the first priority and the second priority is a higher priority.

19. A transport temperature control unit having cooling and heating cycles for cooling and heating a conditioned space within a transport to maintain the conditioned space at a temperature setpoint, the unit comprising:

a first pre-programmed control mode for maintaining the temperature setpoint being programmable into the unit; and a second control mode for maintaining the temperature setpoint being programmable into the unit by an end user, the end user selectively determining whether the first pre-programmed control mode is selectable to control operation of the unit within the conditioned space or the second control mode is programmable into the unit to control operation of the unit within the conditioned space, wherein the second control mode is programmable into the unit by the end user when the second control mode is desired by the end user; and a programmable temperature range, the programmable temperature range being operable to control the operation of the unit in the conditioned space by being selectively operable to utilize one of the first pre-programmed control mode and the second control mode, wherein the unit control mode is one of a cycle mode, continuous mode and a cycle/continuous select mode.

20. The transport temperature control unit as claimed in claim 19, further comprising a selectively determinable fuel saver timer operable to decrease fuel consumption of the unit, the fuel saver timer being selectively determinable by the end user.

21. The transport temperature control unit as claimed in claim 19, further comprising a high speed cool to low speed cool switch point, the high speed cool to low speed cool switch point determining at which temperature the unit switches between high speed cool and low speed cool in the conditioned space, the high speed cool to low speed cool switch point being selectively determinable by the end user.

22. The transport temperature control unit as claimed in claim 19, further comprising a restart temperature, the restart temperature determining the temperature at which the conditioned space restarts from a null condition, the restart temperature being selectively determinable by the end user.

23. The transport temperature control unit as claimed in claim 19, further comprising fans, operation of the fans being selectively determinable by the end user.

24. The transport temperature control unit as claimed in claim 19, further comprising a low speed heat to low speed cool switch point, the low speed heat to low speed cool switch point determining at which temperature the unit switches between low speed heat and low speed cool in the conditioned space, the low speed heat to low speed cool switch point being selectively determinable by the end user.

25. The transport temperature control unit as claimed in claim 19, further comprising door switch options, the door switch options being selectively determinable by the end user.

26. The transport temperature control unit as claimed in claim 19, wherein the programmable temperature range further includes numerical temperature values.

27. The transport temperature control unit as claimed in claim 26, wherein the numerical temperature values include a minimum temperature value and a maximum temperature value.

28. The transport temperature control unit as in claim 19, wherein the programmable temperature range further includes a priority, the priority being selectively determinable by the end user.

29. The transport temperature control unit as claimed in claim 19, further comprising a unit control mode for the programmable temperature range, the unit control mode being selectively determinable by the end user.

30. The transport temperature control unit as claimed in claim 19, wherein the conditioned space is a first conditioned space and the programmable temperature range is a first programmable temperature range, the transport further comprising a second conditioned space and the unit further comprising a second programmable temperature range, the second programmable temperature range being operable to control the operation of the unit in the second conditioned space by being selectively operable to utilize one of the first pre-programmed control mode and the second control mode.

31. The method as claimed in claim 30, wherein the first programmable temperature range and the second programmable temperature range are both operable by the first pre-programmed control mode.

32. The method as claimed in claim 30, wherein the first programmable temperature range and the second programmable temperature range are both operable by the second control mode.

33. A method of controlling a transport temperature control unit to maintain a first conditioned space within a transport at a temperature setpoint, the temperature control unit having cooling and heating cycles for cooling and heating the conditioned space, the temperature control unit including a first programmable temperature range, the transport further comprising a second conditioned space and the unit further comprising a second programmable temperature range, the method comprising:

programming into the unit a first pre-programmed control mode for maintaining the temperature setpoint;

configuring the unit such that a second control mode for maintaining the temperature setpoint is programmable into the unit by an end user;

selecting numerical temperature values for the programmable temperature range, the selection of numerical values being made by the end user;

selecting the first pre-programmed control mode for operation of the programmable temperature range or to program the second control mode into the unit for operation of the programmable temperature range, the selection of the first pre-programmed or to program the second control mode being made by the end user;

programming the second control mode into the programmable temperature range by the end user when the second control mode is desired by the end user;

utilizing one of the first pre-programmed control mode and the second control mode to control the operation of the unit in the second conditioned space with the second programmable temperature range;

selecting a first unit control mode for the first programmable temperature range and a second unit control mode for the second programmable temperature range, wherein the first and second unit control modes are one of a cycle mode, a continuous mode and a cycle/continuous select mode;

selecting a first priority for the first programmable temperature range and a second priority for the second programmable temperature range by the end user, wherein the first priority and the second priority are different priorities;

determining which of the first priority and the second priority is a higher priority; and operating the temperature control unit in the unit control mode corresponding to which of the first priority and the second priority has the higher priority.

* * * * *